(12) United States Patent
Lee et al.

(10) Patent No.: US 11,573,159 B2
(45) Date of Patent: Feb. 7, 2023

(54) IDENTIFYING FRACTURE BARRIERS FOR HYDRAULIC FRACTURING

(71) Applicant: Saudi Arabian Oil Company, Dhahran (SA)

(72) Inventors: Ji Soo Lee, Katy, TX (US); David Jacobi, Spring, TX (US); Gary Eppler, Baytown, TX (US); Joshua Brothers, Cat Spring, TX (US)

(73) Assignee: Saudi Arabian Oil Company, Dhahran (SA)

( * ) Notice: Subject to any disclaimer, the term of this patent is extended or adjusted under 35 U.S.C. 154(b) by 610 days.

(21) Appl. No.: 16/736,646

(22) Filed: Jan. 7, 2020

(65) Prior Publication Data
US 2020/0217766 A1 Jul. 9, 2020

Related U.S. Application Data

(60) Provisional application No. 62/789,912, filed on Jan. 8, 2019.

(51) Int. Cl.
*G01N 3/44* (2006.01)
*E21B 47/09* (2012.01)
(Continued)

(52) U.S. Cl.
CPC ............. *G01N 3/44* (2013.01); *E21B 47/09* (2013.01); *E21B 49/006* (2013.01);
(Continued)

(58) Field of Classification Search
CPC .......... G01N 3/44; G01N 3/52; G01N 23/083; G01N 2203/0019; G01N 2203/0067;
(Continued)

(56) References Cited

U.S. PATENT DOCUMENTS 2,900,269 A 8/1959 Bauman et al.
3,284,281 A 11/1966 Thomas
(Continued)

FOREIGN PATENT DOCUMENTS

CN 101819111 12/2011
CN 1621803 5/2012
(Continued)

OTHER PUBLICATIONS

U.S. Appl. No. 62/506,263, filed May 15, 2017, Jacobi et al.
(Continued)

*Primary Examiner* — Jonathan M Dunlap
(74) *Attorney, Agent, or Firm* — Fish & Richardson P.C.

(57) ABSTRACT

Methods, systems, and computer-readable medium to perform operations for identifying fracture barriers in a well. The operations include converting rebound hardness values of a rock specimen from the well to unconfined compressive strength (UCS) values, where each of the rebound hardness values corresponds to a respective coordinate of a measurement grid imposed on the specimen. The operations further include, for each column of the grid, plotting the UCS values versus depth. Further, the operations include mapping, based on a maximum UCS value and a minimum UCS value, a relative strength contour plot for the specimen. Yet further, the operations include mapping, based on a fixed strength range, an absolute strength contour plot for the specimen. In addition, the operations include determining, based on the relative strength contour, the absolute strength contour, and mineralogy of the rock specimen, that the rock specimen is indicative of a fracture barrier in the well.

20 Claims, 27 Drawing Sheets

(51) Int. Cl.
  *E21B 49/00* (2006.01)
  *G01N 23/083* (2018.01)
  *G01N 3/52* (2006.01)
  *E21B 43/26* (2006.01)

(52) U.S. Cl.
  CPC ............ *G01N 23/083* (2013.01); *E21B 43/26* (2013.01); *E21B 49/00* (2013.01); *G01N 3/52* (2013.01); *G01N 2203/0019* (2013.01); *G01N 2203/0067* (2013.01)

(58) Field of Classification Search
  CPC ........ E21B 47/09; E21B 49/006; E21B 49/00; E21B 43/26
  See application file for complete search history.

(56) References Cited

U.S. PATENT DOCUMENTS

| | | | |
|---|---|---|---|
| 3,716,387 A | 2/1973 | Simmons et al. | |
| 3,807,557 A | 4/1974 | Miller | |
| 3,926,575 A | 12/1975 | Meyers | |
| 3,996,062 A | 12/1976 | Frost | |
| 4,043,885 A | 8/1977 | Yen et al. | |
| 4,220,550 A | 9/1980 | Frenier et al. | |
| 4,223,726 A | 9/1980 | Cha | |
| 4,252,189 A | 2/1981 | Bodine | |
| 4,289,639 A | 9/1981 | Buske | |
| 4,324,560 A | 4/1982 | Fonseca | |
| 4,381,950 A | 5/1983 | Lawson | |
| 4,444,058 A | 4/1984 | Ratigan | |
| 4,587,739 A | 5/1986 | Holcomb | |
| 4,594,170 A | 6/1986 | Brown et al. | |
| 4,640,692 A | 2/1987 | Audeh | |
| 5,193,396 A | 3/1993 | Gorski | |
| 5,302,297 A | 4/1994 | Barthrope | |
| 5,435,187 A | 7/1995 | Ewy | |
| 5,757,473 A | 5/1998 | Kanduth et al. | |
| 5,759,964 A | 6/1998 | Shuchart et al. | |
| 5,869,750 A | 2/1999 | Onan | |
| 5,999,887 A | 12/1999 | Giannakopoulos et al. | |
| 6,095,679 A | 8/2000 | Hammiche et al. | |
| 6,138,760 A | 10/2000 | Lopez et al. | |
| 6,411,902 B1 | 6/2002 | Wiltshire | |
| 6,488,091 B1 | 12/2002 | Weaver | |
| 6,491,425 B1 | 12/2002 | Hammiche et al. | |
| 6,494,263 B2 | 12/2002 | Todd | |
| 6,516,080 B1 | 2/2003 | Nur | |
| 6,749,022 B1 | 6/2004 | Fredd | |
| 6,866,048 B2 | 3/2005 | Mattox | |
| 6,947,843 B2 | 9/2005 | Fisher et al. | |
| 6,989,391 B2 | 1/2006 | Funkhouser | |
| 7,086,484 B2 | 8/2006 | Smith | |
| 7,098,663 B1 | 8/2006 | Bader | |
| 7,344,889 B2 | 3/2008 | Kelemen et al. | |
| 7,369,980 B2 | 5/2008 | Deffenbaugh et al. | |
| 7,526,418 B2 | 4/2009 | Pita et al. | |
| 7,565,831 B2 | 7/2009 | Miyahara | |
| 7,983,845 B2 | 7/2011 | Minh | |
| 8,165,817 B2 | 4/2012 | Betancourt et al. | |
| 8,177,422 B2 | 5/2012 | Kjoller et al. | |
| 8,225,866 B2 | 7/2012 | Rouffignac et al. | |
| 8,278,931 B2 | 10/2012 | Fang et al. | |
| 8,352,228 B2 | 1/2013 | Walters et al. | |
| 8,380,437 B2 | 2/2013 | Abousleiman et al. | |
| 8,473,213 B2 | 6/2013 | Zhu et al. | |
| 8,701,788 B2 | 4/2014 | Wigand et al. | |
| 8,729,903 B2 | 5/2014 | Smka et al. | |
| 8,839,860 B2 | 9/2014 | Wigand et al. | |
| 8,851,177 B2 | 10/2014 | Wigand | |
| 8,865,482 B2 | 10/2014 | Wang et al. | |
| 8,868,385 B2 | 10/2014 | Fertig et al. | |
| 8,936,089 B2 | 1/2015 | Wigand | |
| 9,057,797 B2 | 6/2015 | Omeragic et al. | |
| 9,128,210 B2 | 9/2015 | Pomerantz | |
| 9,152,745 B2 | 10/2015 | Glinsky | |
| 9,696,270 B1 | 7/2017 | Roy et al. | |
| 9,784,882 B2 | 10/2017 | Vinegar et al. | |
| 9,834,721 B2 | 12/2017 | Chang et al. | |
| 9,863,231 B2 | 1/2018 | Hull et al. | |
| 9,869,649 B2 | 1/2018 | Hull et al. | |
| 10,310,136 B2 * | 6/2019 | Von Gonten | G01V 99/005 |
| 10,329,478 B2 | 6/2019 | Schnoor et al. | |
| 10,677,959 B2 * | 6/2020 | Eccles | E21B 49/006 |
| 11,156,743 B2 * | 10/2021 | Von Gonten | G01V 11/002 |
| 2005/0060130 A1 | 3/2005 | Shapiro et al. | |
| 2005/0103118 A1 | 5/2005 | Workman | |
| 2006/0047489 A1 | 3/2006 | Scheidt et al. | |
| 2006/0092766 A1 | 5/2006 | Shelley et al. | |
| 2006/0265204 A1 | 11/2006 | Wallis et al. | |
| 2007/0203677 A1 | 8/2007 | Awwiller | |
| 2007/0246649 A1 | 10/2007 | Jacobi et al. | |
| 2007/0298979 A1 | 12/2007 | Perry et al. | |
| 2008/0006410 A1 | 1/2008 | Looney et al. | |
| 2008/0059140 A1 | 3/2008 | Salmon et al. | |
| 2008/0070806 A1 | 3/2008 | Lin et al. | |
| 2009/0071239 A1 | 3/2009 | Rojas et al. | |
| 2009/0087912 A1 | 4/2009 | Ramos et al. | |
| 2009/0143252 A1 | 6/2009 | Lehmann | |
| 2009/0193881 A1 | 8/2009 | Finnberg | |
| 2009/0248309 A1 | 10/2009 | Nelville et al. | |
| 2009/0313772 A1 | 12/2009 | Talley | |
| 2010/0010106 A1 | 1/2010 | Crews | |
| 2010/0049625 A1 | 2/2010 | Biebesheimer et al. | |
| 2010/0051511 A1 | 3/2010 | Faerman | |
| 2010/0186520 A1 | 7/2010 | Wheeler | |
| 2010/0213579 A1 | 8/2010 | Henry | |
| 2010/0224365 A1 | 9/2010 | Abad | |
| 2010/0258265 A1 | 10/2010 | Karanikas et al. | |
| 2010/0276142 A1 | 11/2010 | Skildum et al. | |
| 2010/0279136 A1 | 11/2010 | Bonucci | |
| 2011/0065612 A1 | 3/2011 | Stokes et al. | |
| 2011/0257944 A1 | 10/2011 | Du et al. | |
| 2011/0259588 A1 | 10/2011 | Ali | |
| 2012/0026037 A1 | 2/2012 | Thomson et al. | |
| 2012/0179444 A1 | 7/2012 | Ganguly et al. | |
| 2012/0193578 A1 | 8/2012 | Pan et al. | |
| 2012/0247774 A1 | 10/2012 | Li et al. | |
| 2012/0261617 A1 | 10/2012 | Pan et al. | |
| 2013/0013209 A1 | 1/2013 | Zhu et al. | |
| 2013/0056213 A1 | 3/2013 | Medvedev et al. | |
| 2013/0084643 A1 | 4/2013 | Commarieu et al. | |
| 2013/0160994 A1 | 6/2013 | Alsop et al. | |
| 2013/0161002 A1 | 6/2013 | Wigand | |
| 2013/0213120 A1 | 8/2013 | Lebedev | |
| 2013/0228019 A1 | 9/2013 | Meadows | |
| 2013/0231908 A1 | 9/2013 | Williams et al. | |
| 2013/0233536 A1 | 9/2013 | Alqam | |
| 2013/0238304 A1 | 9/2013 | Glinsky | |
| 2013/0269933 A1 | 10/2013 | Pomerantz et al. | |
| 2014/0008305 A1 | 1/2014 | Nichols et al. | |
| 2014/0045732 A1 | 2/2014 | Mazyar | |
| 2014/0048694 A1 | 2/2014 | Pomerantz | |
| 2014/0067351 A1 | 3/2014 | Gray et al. | |
| 2014/0116710 A1 | 5/2014 | Naser-El-Din et al. | |
| 2014/0231077 A1 | 8/2014 | Rivero et al. | |
| 2014/0251605 A1 | 9/2014 | Hera | |
| 2014/0260694 A1 | 9/2014 | Szlendak | |
| 2014/0374104 A1 | 12/2014 | Kushal | |
| 2015/0019183 A1 | 1/2015 | Suzuki | |
| 2015/0075782 A1 | 3/2015 | Sharma | |
| 2015/0152724 A1 | 6/2015 | Amendt | |
| 2015/0219791 A1 * | 8/2015 | Eccles | G01V 99/00 702/6 |
| 2015/0233214 A1 | 8/2015 | Dusterhoft et al. | |
| 2015/0293256 A1 | 10/2015 | Dusterhoft | |
| 2016/0103047 A1 | 4/2016 | Liu | |
| 2016/0103049 A1 | 4/2016 | Liu | |
| 2016/0201457 A1 * | 7/2016 | Curry | E21B 49/006 175/50 |
| 2016/0265331 A1 | 9/2016 | Weng et al. | |
| 2016/0313469 A1 * | 10/2016 | Von Gonten | E21B 49/00 |
| 2016/0362965 A1 | 12/2016 | Parlar | |
| 2017/0066959 A1 | 3/2017 | Hull | |
| 2017/0067836 A1 | 3/2017 | Hull et al. | |

(56) References Cited

U.S. PATENT DOCUMENTS

| | | | |
|---|---|---|---|
| 2017/0336528 | A1 | 11/2017 | Badri et al. |
| 2017/0370197 | A1 | 12/2017 | Han et al. |
| 2018/0112126 | A1 | 4/2018 | Yang et al. |

FOREIGN PATENT DOCUMENTS

| | | |
|---|---|---|
| CN | 102183410 | 5/2014 |
| CN | 105445440 | 3/2016 |
| EP | 247669 | 12/1987 |
| EP | 2480625 | 4/2013 |
| EP | 2480626 | 4/2013 |
| WO | WO 1997028098 | 8/1997 |
| WO | WO 2002064702 | 8/2002 |
| WO | WO 2004005435 | 1/2004 |
| WO | WO 2008001218 | 1/2008 |
| WO | WO 2010138914 | 12/2010 |
| WO | WO 2011035292 | 3/2011 |
| WO | WO 2011035294 | 3/2011 |
| WO | WO 2012051647 | 4/2012 |
| WO | WO 2012087887 | 6/2012 |
| WO | WO 2012171857 | 12/2012 |
| WO | WO 2013149122 | 10/2013 |
| WO | WO 2015097116 | 7/2015 |
| WO | WO 2015181028 | 12/2015 |
| WO | WO 2015200060 | 12/2015 |
| WO | WO 2017136641 | 8/2017 |

OTHER PUBLICATIONS

PCT International Search Report and Written Opinion issued in International Appln. No. PCT/US2020/012698 dated Apr. 20, 2020, 16 pages.

Abad et al., "Evaluation of the Material Properties of the Multilayered Oxides formed on HCM12A using New and Novel Techniques," Manuscript Draft, Manuscript No. OXID-D-15-00019, 2015, 44 pages.

Abousleiman et al, "A Micromechanically Consistent Poroviscoelasticity Theory for Rock Mechanics Applications," Int. J. Rock Meeh. Min. Sci. & Geomech. Abstr., 30:7, 1993, 4 pages.

Abousleiman et al, "Anisotropic Porothermoelastic Solution and Hydro-Thermal Effects on Fracture Width in Hydraulic Fracturing," Int. J. Numer. Anal. Meth. Geomech., 2013, 25 pages.

Abousleiman et al, "Geomechanics Field and Laboratory Characterization of Woodford Shale: The Next Gas Play," SPE International, SPE 110120, Society of Petroleum Engineers (SPE), presented at the 2007 SPE Annual Technical Conference and Exhibition on Nov. 11-14, 2007, 14 pages.

Abousleiman et al, "Poroviscoelastic Analysis of Borehole and Cylinder Problems," ACTA Mechanica, 119, 1996, 21 pages.

Abousleiman et al., "GeoGenome Industry Consortium (G2IC)," JIP, 2004-2006, 6 pages.

Abousleiman et al., "GeoMechanics Field Characterization of the Two Prolific U.S. Mid-West Gas Plays with Advanced Wire-Line Logging Tools," SPE 124428, Society of Petroleum Engineers (SPE), SPE International, presented at the 2009 SPE Annual Technical Conference and Exhibition, Oct. 4-7, 2009, 19 pages.

Abousleiman et al., "Mandel's Problem Revisited," Geotechnique, 46:2, 1996, 9 pages.

Abousleiman et al., "Mechanical Characterization of Small Shale Samples subjected to Fluid Exposure using the Inclined Direct Shear Testing Device," Int. J. Rock Mech. & Min. Sci., 47:3, published in 2010, 13 pages.

Abousleiman et al., "Poroelastic Solutions in Transversely Isotropic Media for Wellbore and Cylinder," Int. J. Solids Structures, 35:34-35, 1998, 25 pages.

Abousleiman et al., "The Granular and Polymer Composite Nature of Kerogen-Rich Shale," Acta Geotechnica, Feb. 5, 2016, 24 pages.

Agenet et al., "Fluorescent Nanobeads: a First Step Toward Intelligent Water Tracers," SPE 157019, Society of Petroleum Engineers (SPE), SPE International Oilfield Nanotechnology conference, Jun. 12-14, 2012, 13 pages.

Agilent Technologies, "Field-Deployable Solution for Nanoporosity Measurements in Mud Logging Operations and a Novel Method for Fracability Analysis Using Mud Cuttings," Agilent Technologies, Oct. 2013, 44 pages.

Al-Kattan and Al-Ameri, "Estimation of the Rock Mechanical Properties Using Conventional Log Data in North Rumaila Field," Iraqi Journal of Chemical and Petroleum Engineering, 13:4, Dec. 2012, 7 pages.

Allan et al., "A Multiscale Methodology for the Analysis of Velocity Anisotropy in Organic-Rich Shale," Geophysics, 80:4, Jul.-Aug. 2015, 16 pages.

Altowairqi, "Shale elastic property relationships as a function of total organic carbon content using synthetic samples," Journal of Petroleum Science and Engineering 133, Sep. 2015, 9 pages.

Ananthan et al., "Influence of Strain Softening on the Fracture of Plain Concrete Beams," Int. J. of Fracture, 45, 1990, 25 pages.

Anisimov, "The Use of Tracers for Reservoir Characterization," SPE 118862, Society of Petroleum Engineers (SPE), presented at SPE Middle East Oil and Gas Show and Conference, Mar. 15-18, 2009, 8 pages.

Archer and Rasouli, "A log based analysis to estimate mechanical properties and in-situ stresses in a shale gas well in North Perth Basin," Petroleum and Mineral Resources, WIT Transactions on Engineering Sciences, 81, 2012, 12 pages.

Aslan et al., "Fluorescent Core—Shell AG@$SiO_2$ Nanocomposites for Metal-Enhanced Fluorescence and Single Nanoparticle Sensing Platforms," Jan. 19, 2007, 2 pages.

Ballice, "Solvent Swelling Studies of Goynuk (Kerogen Type-I) and Beypazari Oil Shales (Kerogen Type-II)," Science Direct, Fuel 82, 2003, 5 pages.

Bazant et al., "Deformation of Progressively Cracking Reinforced Concrete Beams," ACI Journal, Technical Paper, Title No. 81-26, 81:3, May-Jun. 1984, 11 pages.

Bazant et al., "Size Effect in Brazilian Split-Cylinder Tests: Measurements and Fracture Analysis," ACI Materials Journal, 88:3 (325-332), May 31, 1991.

Bazant et al., "Strain-Softening Bar and Beam: Exact Non-Local Solution," Int. J. Solids Structures, 24:7, 1988, 15 pages.

Behura et al., "The shear properties of oil shales," Special Selection: Unconventional Resources and CO2 Monitoring, The Leading Edge, Jul. 2009, 6 pages.

Bennett et al., "Instrumented Nanoindentation and 3D Mechanistic Modeling of a Shale at Multiple Scales," Acta Geotechnica, 10:21, Jan. 9, 2015, 14 pages.

Bhandari et al., "Two-Dimensional DEM Analysis of Behavior of Geogrid-Reinforced Uniform Granular Bases under a Vertical Cyclic Load," Acta Geotechnica, 2014, 12 pages.

Biot et al., "Temperature analysis in hydraulic fracturing," Journal of Petroleum Technology, Nov. 1987, 39(11): 1389-1397.

Biot, "General Theory of Three-Dimensional Consolidation," Journal of Applied Physics, 12:2, Feb. 1941, 11 pages.

Bobko et al., "The Nanogranular Origin of Friction and Cohesion in Shale—A Strength Homogenization Approach to Interpretation of Nanoindentation Results," Int. J. Numer. Anal. Meth. Geomech., 2010, 23 pages.

Boskey et al., "Perspective—Collagen and Bone Strength," Journal of Bone and Mineral Research, 14:3, 1999, 6 pages.

Bousige et al., "Realistic molecular model of kerogen's nanostructure," Nature Materials, Advance Online Publication, Feb. 1, 2016, 8 pages.

Brochard et al., "Fracture Properties of Kerogen and Importance for Organic-Rich Shales," Annual World Conference on Carbon (Carbon 2013), Jul. 2013, 5 pages.

Bunzil et al., "Taking advantage of luminescent lanthanide ions," Chemical Society Reviews, Dec. 2005, 29 pages.

Cahill et al., "Nanoscale Thermal Transport II," Applied Physics Reviews 1.1, 2014, 46 pages.

Cahill et al., "Nanoscale thermal transport," Journal of applied physics, Jan. 2003, 93:2 (793-818).

Carcione and Avseth, "Rock-physics templates for clay-rich source rocks," Geophysics 80:5 (D481-D500), Sep. 2015, 21 pages.

Carter and Hanson, "Fake Moon Dirt, HOOD Solar System Science," UT Dallas Magazine, 6:2, Spring 2016, 1 page.

(56) References Cited

OTHER PUBLICATIONS

Chang et al., "Magnetic SERS Composite Nanoparticles for Microfluidic Detection," 251st ACE National Meeting, Mar. 13-17, 2016, 1 pages.

Chen et al., "Size Effect in Micro-Scale Cantilever Beam Bending," Acta Meeh., 2011, 17 pages.

Chen et al., "FITC functionalized magnetic core-shell $Fe_3O_4$/Ag hybrid nanoparticle for selective determination of molecular biothiols," Elsevier Ltd., Dec. 2013, 7 pages.

Chern et al., "Deformation of Progressively Cracking Partially Prestressed Concrete Beams," PCI Journal, 37:1, 1992, 11 pages.

Chuang et al., "Ultra-sensitive in-situ detection of novel near-infrared persistent luminescent tracer nanoagents in crude oil-water mixtures," a natureresearch journal, Scientific Reports, Jun. 15, 2016, 5 pages.

Chupin et al., "Finite Strain Analysis of Nonuniform Deformation Inside Shear Bands in Sands," Int. J. Numer. Anal. Meth. Geomech., 2012, 16 pages.

Committee on Field Tests, "International Society of Rock Mechanics—Commission on Standardization of Laboratory and Field Tests, Suggested methods for quantitative description of discontinuities in rock," Int. J. Rock Mech. Min. Sci. & Geomech. Abstr. 15: 319-368, Committee on Field Tests, Oct. 1977, 50 pages.

Corapcioglu, "Fracturing Fluid Effects on Young's Modulus and Embedment in the Niobrara Formation," Thesis for degree of Master of Science (Petroleum Engineering), Colorado School of Mines, 2014, 189 pages.

Cubillos et al., "The Value of Inter-well and Single Well Tracer Technology for De-Risking and Optimizing a CEOR Process—Caracara Field Case," SPE 174394-MS, Society of Petroleum Engineers (SPE), presented at EUROPEC 2015, Jun. 1-4, 2015, 19 pages.

Custelcean et al., "Aqueous Sulfate Separation by Crystallization of Sulfate-Water Clusters," Angew. Chem. Int. Ed., 2015, 54: 10525-10529.

Daneshy, "Hydraulic Fracturing to Improve Production," Tech 101, TheWayAhead, 6:3, Oct. 2010, 4 pages.

Danuor et al., "Determination of the Source and Depositional Environment of Sediments of Lake Bosumtwi using X-Ray Diffraction (XRD) Techniques," International Research Journal of Geology and Mining (IRJGM) 2:7 (186-198), Sep. 2012, 13 pages.

Das et al., "Molecular Fluorescence, Phosphorescence, and Chemiluminescence Spectrometry," Analytical Chemistry, Nov. 3, 2011, 29 pages.

De Block et al., "A New Solution for the Characterization of Unconventional Shale Resources Based on Analysis or Drill Cutting," SPE-177601-MS, Society of Petroleum Engineers (SPE), SPE International, presented at the Abu Dhabi International Petroleum Exhibition and Conference, Nov. 9-12, 2015, 6 pages.

Deans, "Using Chemical Tracers to Measure Fractional Flow and Saturation In-Situ," SPE 7076, Society of Petroleum Engineers (SPE), presented at SPE Symposium on improved Methods of Oil Recovery, Apr. 16-17, 1978, 10 pages.

Deere et al., "Engineering classifications and index properties for intact rock," Technical Report No. AFWL-TR 65-116, Air Force Weapons Library, Kirtland Air Force Base, New Mexico, USA, Dec. 1966, 327 pages.

Deirieh et al., "Nanochemomechanical Assessment of Shale: A Coupled WDS-Indentation Analysis," Acta Geotechnica, 2012, 25 pages.

Delafargue and Ulm, "Explicit approximations of the indentation modulus of elastically orthotropic solids for conical indenters," International Journal of Solids and Structures 41:26, Dec. 2004, 10 pages.

Devarapalli et al., "Micro-CT and FIB-SEM imaging and pour structure characterization of dolomite rock at multiple scales," Arabian Journal of Geosciences, Aug. 2017, 9 pages.

Du et al., "Interwell Tracer Tests: Lessons Learned from past Field Studies," SPE 93140, Society of Petroleum Engineers (SPE), presented at SPE Asia Pacific Oil and Gas Conference and Exhibition, Apr. 5-7, 2005, 9 pages.

Ekbote et al., "Porochemoelastic Solution for an Inclined Borehole in a Transversely Isotropic Formation," J. of Eng, Mech., ASCE, Jul. 2006, 10 pages.

El-Aneed et al., "Mass Spectrometry, Review of the Basics: Electrospray, MALDI, and Commonly Used Mass Analyzers," Applied Spectroscopy Reviews, Mar. 16, 2009, 22 pages.

Elijah, "Numerical Modeling of Wellbore Instability (Tensile Failure) Using Fracture Mechanics Approach," Thesis for the degree of Master of Science, African University of Science and Technology Abuja, May 2013, 77 pages.

Elkatatny et al., "Development of a new correlation to determine the static Young's modulus," Journal of Petroleum Exploration and Production Technology, 8:1, Mar. 2018, 14 pages.

EQUOTIP, "EQUOTIP Operating Instructions," Manual, 2016, PROCEQ, 52 pages.

Ertas et al., "Petroleum Expulsion Part 1. Theory of Kerogen Swelling in Multicomponent Solvents," Energy & Fuels, 2006, 6 pages.

Esfahani et al., "Quantitative nanoscale mapping of three-phase thermal conductivities in filled skutterudites via scanning thermal microscopy," National Science Review, Feb. 2017, 5:1 (59-69).

Ewy, "Shale Swelling/Shrinkage and Water Content Change due to Imposed Suction and Due to Direct Brine Contact," Acta Geotechnica, 2014, 18 pages.

Frazer et al., "Localized Mechanical Property Assessment of SiC/SiC Composite Materials," Science Direct, 2015, Part A:70 (93-101).

Gao et al., "Materials Become Insensitive to Flaws at Nanoscale: Lessons from Nature," PNAS, May 13, 2003, 100:10 (5597-600).

Gardiner et al., "Practical Raman Spectroscopy," Springer-Verlag, 1989, 9 pages.

Garnero, "The Contribution of Collagen Crosslinks to Bone Strength," Int. Bone & Mineral Society, Sep. 2012, 8 pages.

Georgi et al., "Physics and Chemistry in Nanoscale Rocks", SPE Fomm Series: Frontiers of Technology, Mar. 22-26, 2015, La Jolla, California, USA, 4 pages.

Glossary.oilfield.slb.com' [online], "Oilfield Glossary: fluid-friction reducer," available on or before Jun. 15, 2017, retrieved from URL< http://www.glossary.oilfield.slb.com/Terms/f/fluid-friction_reducer.aspx>, 1 page.

Glover et al., "The Use of Measurements Made on Drill Cuttings to Construct and Apply Geomechanical Well Profiles," ARMA 16-0737, ARMA, presentation at the 50th US Rock Mechanics/Geomechanics Symposium, Jun. 26-29, 2016, 11 pages.

Goodman, "Chapter 3: Rock Strength and Failure Criteria," in Introduction to Rock Mechanics, John Wiley & Sons, 21 pages.

Han et al., "Chapter 2: Principles of Drilling and Excavation," in Drilling in Extreme Environments: Penetration and Sampling on Earth and Other Plants, Aug. 2009, 107 pages.

Han et al., "LBM-DEM Modeling of Fluid-Solid Interaction in Porous Media," Int. J. Numer. Anal. Meth. Geomech., 2013, 37: 1391-1407.

Han et al., "Numerical Modeling of Elastic Hemispherical Contact for Mohr-Coulomb Type Failures in Micro-Geomaterials," Experimental Mechanics, 57, Jun. 16, 2017, 15 pages.

Han et al., "Application of Silver-Coated Magnetic Microspheres to a SERS-Based Optofluidic Sensor," The Journal of Physical Chemistry (JPCC), Mar. 7, 2011, 7 pages.

Havens, "Mechanical Properties of the Bakken Formation," thesis for degree of Master of Science (Geophysics) at the Colorado School of Mines, Department of Geophysics, 2012, 123 pages.

Hillier, "Accurate quantitative analysis of clay and other minerals in sandstones by XRD: comparison of a Rietveld and a reference intensity ratio (RIR) method and the importance of sample preparation," Clay Minerals, 2000, 35:391-302.

Hoang et al., "Correspondence Principle Between Anisotropic Poroviscoelasticity and Poroelasticity using Micromechanics and

(56) References Cited

OTHER PUBLICATIONS

Application to Compression of Orthotropic Rectangular Strips," Journal of Applied Physics, American Institute of Physics, Aug. 2012, 112, 16 pages.

Hornby et al., "Anisotropic Effective-Medium Modeling of the Elastic Properties of Shales," Geophysics, Oct. 1994, 59:10 (1570-1583).

Hosemann et al, "Mechanical Characteristics of SiC Coating Layer in TRISO Fuel Particles," Journal of Nuclear Materials, 2013, 442: 133-142.

Hosemann et al., "An Exploratory Study to Determine Applicability of Nano-Hardness and Micro-compression Measurements for Yield Stress Estimation," Science Direct, 2008, 375: 135-143.

Hu et al., "Smart Liquid SERS Substrates based on $Fe_3O_4$/Au Nanoparticles with Reversibility Tunable Enhancement Factor for Practical Quantitative Detection," a natureresearch journal, Scientific Reports, Nov. 2014, 4:7204, 10 pages.

Hull and Abousleiman, "Chapter 10: Insights of the Rev of Source Shale from Nano- and Micromechanics," in New Frontiers in Oil and Gas Exploration, Springer International Publishing Switzerland, 2016, 29 pages.

Huseby et al., "High Quality Flow Information from Tracer Data," SPE-169183-MS, Society of Petroleum Engineers (SPE), presented at the SPE Bergen One Day Seminar, Grieghallen, Bergen, Norway, Apr. 2, 2014, 9 pages.

Hutchins et al., "Aqueous Tracers for Oilfield Applications," SPE-21049, Society of Petroleum Engineers (SPE), presented at the SPE International Symposium on Oilfield Chemistry, Anaheim, California, Feb. 20-22, 1991; Society of Petroleum Engineers, 1991, 9 pages.

Hydraulic Fracturing Fluid Product Component Information Disclosure; 2 pages.

Iqbal et al., "In situ micro-cantilver tests to study fracture properties of NiAl single crystals," Acta Materialia, Feb. 2012, 60:3 (1193-1200).

Itasca (online), "Three-dimensional Fast Lagrangian Analysis of Continua (FLAC3D)," available on or before 2012, [retrieved on Jun. 7, 2018], retrieved from URL: <https://www.itascacg.com/software/flac3d>, 4 pages.

Iyengar et al., "Analysis of Crack Propagation in Strain-Softening Beams," Engineering Fracture Mechanics, 2002, 69: 761-778.

Jia et al., "Highly Efficient Extraction of Sulfate Ions with a Tripodal Hexaurea Receptor," Angew. Chem. Int. Ed., 2011, 50:486-490.

Jianhong et al., "Estimation of the Tensile Elastic Modulus using Brazilian disc by Applying Diametrically Opposed Concentrated Loads," International Journal of Rock Mechanics & Mining Sciences, 2009, 46(3): 568-576.

Jose et al., "Continuous multi cycle nanoindentation studies on compositionally graded $Ti_{1-x}Al_xN$ multilayer thin films," Materials Science and Engineering, ELSEVIER, Apr. 2011, 528(21): 6438-6444.

Jun et al., "Multifunctional Silver-Embedded Magnetic Nanoparticles as SERS Nanoprobes and Their Applications," Wiley-VCH Verlag GmbH& Co. KGaA, Weinheim, Jan. 4, 2010, 7 pages.

Kadhim et al., "Using Well Logs Data to Estimate Dynamic Elastic Properties of Carbonate Formation," International Journal of Physical and Human Geography, Jun. 2016, 4(2): 1-15.

Kelemen et al., "Petroleum Expulsion Part 2. Organic Matter Type and Maturity Effects on Kerogen Swelling by Solvents and Thermodynamic Parameters for Kerogen from Regular Solution Theory," Energy & Fuels, 2006, 20: 301-308.

Kethireddy, "Quantifying the effect of kerogen on Electrical Resistivity Measurements in Organic Rich Source Rocks," Thesis in partial fulfillment of the requirements for the degree of Master of Science, Dec. 2013, 78 pages.

Khatibi et al., "Raman spectroscopy to study thermal maturity and elastic modulus of kerogen," International Journal of Coal Geology, Jan. 2018, 185: 103-118.

Kim et al., "Numerical analysis of fracture propagation during hydraulic fracturing operations in shale gas systems," International Journal of Rock and Mechanics Mining Sciences 76, 2015.

Klapetek, "Chapter 11: Thermal Measurements," in Quantitative Data Processing in Scanning Probe Microscopy: SPE Applications for Nanometrology, 2018, 26 pages.

Kneipp et al., "Single Molecule Detection Using Surface-Enhanced Raman Scattering (SERS)," Physical Review Letters, American Physical Society 78:9, Mar. 3, 1997, 4 pages.

Kolymbas, "Kinematics of Shear Bands," Acta Geotechnica, 2009, 4: 315-318.

Kumar et al., "Nano to Macro Mechanical Characterization of Shale," SPE 159804, Society of Petroleum Engineers (SPE), presented at the SPE Annual Technical Conference and Exhibition, San Antonio, Texas, Oct. 8-10, 2012, 23 pages.

Kwabi, "Mineral, Fluid, Elastic Property Quantification from Well Logs and Core Data in the Eagle Ford Shale Play: A Comparative Study," Thesis for Degree of Master of Science and Engineering at the University of Texas at Austin, Aug. 2013, 135 pages.

Lam et al., "Experiments and Theory in Strain Gradient Elasticity," J. Mech. and Phys. of Solids, 2003, 51: 1477-1508.

Larsen et al., "Changes in the Cross-Link Density of Paris Basin Toarcian Kerogen During Maturation," Organic Geochemistry, 2002, 33: 1143-1152.

Lee et al., "Comparison of different methods to estimate uniaxial compressive strength in a Barnett shale," ARMA 16-0455, in proceedings of the 50th US Rock Mechanics/Geomechanics Symposium, Jun. 26-29, 2016, 9 pages.

Lee et al., "New application of rebound hardness numbers to generate logging of unconfined compressive strength in laminated shale formations," AMRA 14-6972, in proceedings of the 48th US Rock Mechanics/Geomechanics Symposium, Minneapolis, MN, Jun. 1-4, 2014, 7 pages.

Lee, "A study on rock slope stability in Boeun region using distinct element method," MS Thesis, Department of Earth System Sciences, Yonsei University, Seoul, South Korea, 2001, 6 pages, English translation.

Lee, "Calibration of rebound hardness numbers to unconfined compressive strength in shale formations," Journal of Petroleum Technology, JPT, Jan. 2015, 5 pages.

Lee, "Time-dependent crack growth in brittle rocks and field applications to geologic hazards," PhD Dissertation. Department of Mining and Geological Engineering, University of Arizona, Tucson, AZ 2007, 272 pages.

Leeb, "New dynamic method for hardness testing of metallic materials," VDI-Report, 308: 123-128, 1978, 5 pages.

Li et al., "Mechanical Characterization of Micro/Nanoscale Structures for MEMS/NEMS Applications using Nanoindentation Techniques," Science Direct, 2003, 775 pages.

Li et al., "The Brazilian Disc Test for Rock Mechanics Applications: Review and New Insights," Rock Mech Rock Eng, 2013, 46: 269-287.

Liu, "Dimension effect on mechanical behavior of silicon microcantilver beams," Measurement, 41:8, Oct. 2008, 11 pages.

Liu, "Elastic Constants Determination and Deformation Observation Using Brazilian Disk Geometiy," Experimental Mechanics, 2010, 50: 1025-1039.

Liu, "Fracture Toughness Assessment of Shales by Nanoindentation," Thesis for the degree of Master of Science in Civil Engineering, Geotechnical Engineering Masters Projects, University of Massachusetts Amherst, Sep. 2015, 80 pages.

Liu, "Micro-cantilever Testing to Evaluate the Mechanical Properties of Thermal Barrier Coatings," 19th European Conference on Fracture (ECF19): Fracture Mechanics for Durability, Reliability and Safety; Conference Proceedings held Aug. 26-31, 2012, Kazan, Russia, 7 pages.

Luan et al., "Creation of synthetic samples for physical modelling of natural shale," Geophysical Prospecting vol. 64, Jul. 2016, 17 pages.

Mahabadi et al., "A novel approach for micro-scale characterization and modeling of geomaterials incorporating actual material heterogeneity," Geophysical Research Letters, American Geophysical Union, 39:1 (L01303), Jan. 1, 2012, 6 pages.

(56) References Cited

OTHER PUBLICATIONS

Mahmoud et al., "Removal of Pyrite and Different Types of Iron Sulfide Scales in Oil and Gas Wells without H2S Generation," IPTC-18279-MS, presented at the International Petroleum Technology Conference (IPTC), Doha, Qatar, Dec. 6-9, 2015, 8 pages.

Maio et al., "Measuring Fracture Toughness of Coatings using Focused-ion-beam-machined Microbeams," 2004, 4 pages.

Marchetti et al., "Fluorous affinity chromatography for enrichment and determination of perfluoroalkyl substances," Annual Review of Analytical Chemistry 84, Jul. 19, 2012, 8 pages.

Marinos and Hoek, "Estimating the geotechnical properties of heterogeneous rock masses such as flysch," Bull. Eng. Geol. & the Environment (IAEG), 60:85-92, 2001, 8 pages.

Maxwell, "Microseismic hydraulic fracture imaging: The path toward optimizing shale gas production," The Leading Edge, Mar. 2011, 6 pages.

McCann and Entwisle, "Determination of Young's modulus of the rock mass from geophysical well logs," Geological Applications of Wireline Logs II, Geological Society of Special Publication 65, Dec. 1, 1992, 9 pages.

Mesa, "Spherical and rounded cone nano indenters," Micro Star Technologies Inc., available on or before Jan. 23, 2018, 24 pages.

Montaut et al., "Detection and quantification of rock physics properties for improved hydraulic fracturing in hydrocarbon-bearing shale," SPWLA 54th Annual Logging Symposium, Jun. 22-26, 2013, 16 pages.

Montgomery, "Chapter 2: Fracturing Fluid Components," in Intech open science open minds, Montgomery, 2013, 21 pages.

Moyer, "A Case for Molecular Recognition in Nuclear Separations: Sulfate Separation from Nuclear Wastes," Inorganic Chemistry, 2012, 3473-3490.

Moyner et al., "The Application of Flow Diagnostics for Reservoir Management," Society of Petroleum Engineers (SPE), Apr. 2015, 18 pages.

Oliver and Pharr, "An improved technique for determining hardness and elastic modulus using load and displacement sensing indentation experiments," Journal of Materials Research, 7:6, Jun. 1992, 20 pages.

Oliver and Pharr, "Measurement of hardness and elastic modulus by instrumented indentation: Advances in understanding and refinements to methodology," Journal of Materials Research, 19:1, Jan. 2004, 18 pages.

Ortega et al., "The Effect of Particle Shape and Grain-Scale Properties of Shale: A Micromechanics Approach," Int. J. Numer. Anal. Methd. Geomech., 2010, 33 pages.

Ortega et al., "The Effect of the Nanogranular Nature of Shale on their Poroelastic Behavior," Acta Geotechnica, 2007, 28 pages.

Ortega et al., "The Nanogranular Acoustic Signature of Shale," Geophysics, 74:3, May-Jun. 2009, 20 pages.

Pant, "Nanoindentation characterization of clay minerals and clay-based hybrid bio-geomaterials," dissertation for degree of Doctor of Philosophy in the Department of Civil and Environmental Engineering at the Louisiana State University and Agricultural and Medical College, Dec. 2013, 111 pages.

Passey et al., "From Oil-Prone Source Rock to Gas-Producing Shale Reservoir—Geologic and Petrophysical Characterization of Unconventional Shale-Gas Reservoirs," Society of Petroleum Engineers (SPE), International, CPS/SPE International Oil & Gas Conference and Exhibition, Beijing, China, Jun. 8-10, 2010, 29 pages.

Petoud et al., "Brilliant SM, Eu, Tb, and Dy Chiral Lanthanide Complexes with Strong Circularly Polarized Luminescence," Journal fo the American Chemical Society (JACS), Dec. 15, 2006, 7 pages.

Podio et al., "Dynamic Properties of Dry and Water-Saturated Green River Shale under Stress," SPE 1825, Society of Petroleum Engineers (SPE), Jun. 11, 1968, 16 pages.

Pollard et al., "Fundamentals of Structural Geology," Cambridge University Press, Sep. 1, 2005, p. 291.

Pollock and Hammiche, "Micro-thermal analysis: techniques and applications," Journal of Physics D: Applied Physics, 34.9, 2001, 31 pages.

Poon et al., "An Analysis of Nanoindentation in Linearly Elastic Solids," International Journal of Solids and Structures, 45:24, Dec. 1, 2008, 16 pages.

Potter and Foltinek, "Formation elastic parameters by deriving S-wave velocity logs," CREWES Research Report, Jan. 9, 1997, 13 pages.

Prasad et al., "Acoustic Signatures, Impedance Microstructure, Textural Scales and Anisotrophy of Kerogen-Rich Shales," SPE 124840-MS, Society of Petroleum Engineers (SPE), Annual Technical Conference and Exhibition, Oct. 4-7, 2009, 13 pages.

Proceq S.A. 2014. 2014 Equotip, Copyright, Switzerland, 1 page.

Rajbanshi et al., "Sulfate Separation from Aqueous Alkaline Solutions by Selective Crystallization of Alkali Metal Coordination Capsules," Cryst. Growth Des., 2011, 2702-2706.

Rezaee et al., "Depositional Environment Interpretation of Lar Formation (Upper Jurassic) Based on Study of Clay Mineralogy and Microfacies in East Azarbaijan (North Western of Iran)," Asian Journal of Earth Sciences, 7:1 (17-26), 2014, 10 pages.

Richard et al, "Slow Relaxation and Compaction of Granular Systems," Nature Materials, 4, Feb. 2005, 8 pages.

Rowan et al., "Dynamic Covalent Chemistry," Angewante Chemie International Edition, Mar. 15, 2002, 55 pages.

Selvin et al., "Principles and biophysical applications of lanthanide-based probes," Annual Review of Biophysics and Biomolecular Structure, Jun. 2002, 28 pages.

Serres-Piole et al., "Water tracers in oilfield applications: Guidelines," Elsevier Ltd., Journal of Science and Engineering, Nov. 2012, 18 pages.

Shahid et al., "Natural-fracture reactivation in shale gas reservoir and resulting microseismicity," Journal of Canadian Petroleum Technology 54.06, 2015.

Sharma and Arya, "Formation strength estimation from well log data for sand cut analysis in Tapti-Daman Area, Western Offshore Basin, India," presented at the 6th International Conference and Exposition on Petroleum Geophysics, Kolkata 2006, Jan. 9-11, 2006, 4 pages.

Shin et al., "Development and Testing of Microcompression for Post Irradiation Characterization of OPS Steels," J. Nuclear Materials, 2014, 6 pages.

Shook et al., "Determining Reservoir Properties and Flood Performance from Tracer Test Analysis," SPE 124614, Society of petroleum Engineers (SPE), presented at SPE Annual Technical Conference and Exhibition, Oct. 4-7, 2009, 19 pages.

Shukla et al., "Nanoindentation Studies on Shales," ARMA 13-578, ARMA, presented at the 47th US Rock Mechanics/Geomechanics Symposium, Jun. 23-26, 2013, 10 pages.

Sierra et al., "Woodford Shale Mechanical Properties and the Impacts of Lithofacies," ARMA 10-461, copyright 2010, 10 pages.

Singh et al., "Facies classification based on seismic waveform," presented at the 5th Conference & Exposition on Petroleum Geophysics, Jan. 15-17, 2004, 7 pages.

Siskin et al., "Reactivity of organic compounds in hot water: geochemical and technological implications," Science, Oct. 11, 1991, 8 pages.

Slatt et al., "Merging Sequence Stratigraphy and Geomechanics for Unconventional Gas Shales," The Leading Edge, Mar. 2011, 8 pages.

Slatt et al., "Outcrop/Behind Outcrop (Quarry), Multiscale Characterization of the Woodford Gas Shale," 2011, 22 pages.

Sone and Zoback, "Mechanical Properties of Shale-Gas Reservoir Rocks, Part 1: Static and dynamic elastic properties and anisotropy," Geophysics 78:5, Sep.-Oct. 2013, 12 pages.

Sone et al., "Mechanical Properties of Shale-Gas Reservoir Rocks, Part 2: Ductile creep, brittle strength, and their relation to the elastic modulus," Geophysics 78:5, Sep.-Oct. 2013, 10 pages.

Song et al., "SERS-Encoded Nanogapped Plasmonic Nanoparticles: Growth of Metallic Nanoshell by Templating Redox-Active Polymer Brushes," Journal of the American Chemical Society (JACS), Apr. 28, 2014, 4 pages.

(56) References Cited

OTHER PUBLICATIONS

Stiles et al., "Surface-enhanced Raman Spectroscopty," Annual Review of Analytical Chemistry, Mar. 18, 2008, 29 pages.
Tabatabaei et al., "Well performance diagnosis with temperature profile measurements," Society of Petroleum Engineers (SPE), in SPE Annual Technical Conference and Exhibition, Society of Petroleum Engineers, Oct. 30-Nov. 2, 2011, Jan. 2011, 16 pages.
Tian et al., "Off-Resonant Gold Superstructures as Ultrabright Minimally Invasive Surface-Enhanced Raman Scattering (SERS) Probes," American Chemical Society, Jul. 2015, 7 pages.
Till and Spears, "The determination of quartz in sedimentary rocks using an x-ray diffraction method," Clays and Clay Minerals, 17: 323-327, 1969, 5 pages.
Ulm et al., "Material Invariant Poromechanics Properties of Shales," 2005, 8 pages.
Ulm et al., "The Nanogranular Nature of Shale," Acta Geotechnica, 2006, 12 pages.
Vanlandingham, "Review of Instrumented Indentation," Journal of Research of the National Institute of Standards and Technology, 108:4, Jul.-Aug. 2003, 17 pages.
Vernik and Landis, "Elastic Anisotropy of Source Rocks: Implications for Hydrocarbon Generation and Primary Migration," 80:4, Apr. 1996, 14 pages.
Vernik et al., "Ultrasonic Velocity and Anisotropy of Hydrocarbon Source Rocks," Geophysics, 57:5, May 1992, 9 pages.
Walters et al., "Inetic rheology of hydraulic fracturing fluids," Society of Petroleum Engineers (SPE), SPE Annual Technical Conference and Exhibition, Society of Petroleum Engineers, 2001.
Wang et al., "Iron Sulfide Scale Dissolvers: How Effective Are They?" SPE 168063, Society of Petroleum Engineers (SPE), presented at the SPE Saudi Arabia section Annual Technical Symposium and Exhibition, May, 19-22, 2013, 22 pages.
Wang et al., "The Flattened Brazilian Disc Specimen Used for Testing Elastic Modulus, Tensile Strength and Fracture Toughness of Brittle Rocks: Analytical and Numerical Results," International Journal of Rock Mechanics and Mining Sciences, 41:2 (245-253).
Warpinski, "Understanding Hydraulic Fracture Growth, Effectiveness, and Safety Through Microseismic Monitoring," Intech, May 17, 2013, 14 pages.
Wegst et al., "Bioinspired structural materials," Nature Materials, Jan. 14, 2015, 14 pages.
Wenk et al., "Preferred Orientation and Elastic Anisotropy of Illite-Rich Shale," Geophysics, 72:2, Mar.-Apr. 2007, 7 pages.
Wessels et al., "Identifying fault activation during hydraulic stimulation in the Barnett shale: source mechanisms, b values, and energy release analyses of microseismicity," presented at the SEG San Antonio 2011 Annual Meeting, Sep. 18-23, 2011, 5 pages.
West and Shakoor, "Chapter 8: Engineering properties of rocks," in Geology Applied to Engineering, 2nd Edition, Waveland Press, Inc., ISBM 1-4786-3500-2, p. 170, 2018, 1 page.
White et al., "A thermoplasticity model for oil shale," LLNL-CONF-667671, Lawrence Livermore National Labtoratory, presented at the Fifth International Conference on Coupled Thermo-Hydro-Mechanical-Chemical Processes in Geosystems, Feb. 25-27, 2015, 20 pages.
Wilson et al., "Fracture testing of bulk silicon microcantilever beams subjected to a side load," Journal of Microelectromechanical Systems, 5:3, Sep. 1996, 9 pages.
Wu et al., "A reusable biosensor chip for SERS-fluorescence dual mode immunoassay," Proc. SPIE 9543, Third International Symposium on Laser Interaction with Matter, 954317, May 4, 2015, 6 pages.
Wu et al., "A SERS-Assisted 3D Barcode Chip for High-Throughput Biosensing," Small Journal 11:23, Jun. 11, 2015, 9 pages.
Wurster et al., "Characterization of the fracture toughness of micro-sized tungsten single crystal notched specimens," Philosophical Magazine, 92:14, May 2012, 23 pages.
Xu et al., "Measurement of two-photon excitation cross sections of molecular fluorophores with data from 690 to 1050 nm," Journal of the Optical Society of America B, Mar. 1996, 11 pages.
Yan and Han, "Measurement of elastic properties of kerogen," SEG Houston 2013 Annual Meeting, SEG Technical Program Expanded Abstracts, Sep. 2013, 5 pages.
Yang et al., "Nanoscale geochemical and geomechanical characterization of organic matter in shale," Nature Communications, 8:2179, Dec. 19, 2017, 9 pages.
Zamberi et al., "Improved Reservoir Surveillance Through Injected Tracers in a Saudi Arabian Field: Case Study," SPE 166005, Society of Petroleum Engineers (SPE), presented at SPE Reservoir Characterization and Simulation Conference and Exhibition, Sep. 16-18, 2013, 15 pages.
Zemel, "Chapter 3: Interwell Water Tracers," in Tracers in the Oil Field, 43, 1st Edition, Elsevier Science, Jan. 13, 1995, 47 pages.
Zeszotarski et al., "Imaging and Mechanical Property Measurements of Kerogen via Nanoindentation," Geochimica et Cosmochimica Acta, 68:20, Oct. 15, 2004, 7 pages.
Zhou et al., "Upconversion luminescent materials: advances and applications," Chem Rev., Jan. 14, 2015, 71 pages.

\* cited by examiner

| MINERAL | % | COLOR |
|---|---|---|
| QUARTZ | 1.3 | |
| KSPAR | 0.0 | |
| ALBITE | 0.0 | |
| CALCITE | 90.0 | |
| DOLOMITE | 0.0 | |
| ILLITE | 4.9 | |
| SMECTITE | 0.0 | |
| KAOLINITE | 0.0 | |
| CHLORITE | 0.0 | |
| PYRITE | 1.4 | |
| ANHYDRITE | 0.0 | |
| APATITE | 0.0 | |
| ANATASE | 0.0 | |
| SPHALERITE | 0.0 | |
| KEROGEN | 2.2 | |

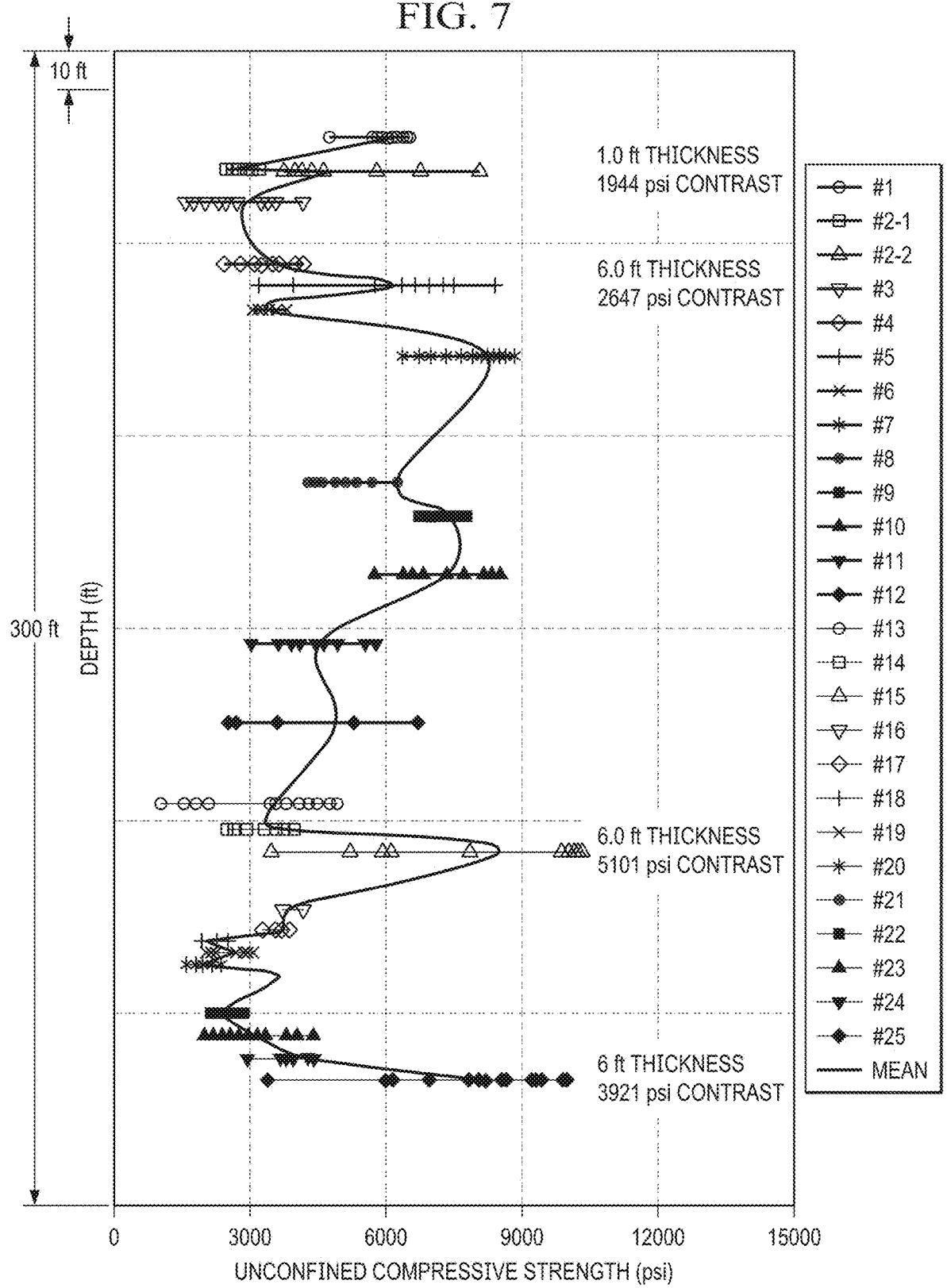

IDENTIFYING FRACTURE BARRIERS FOR HYDRAULIC FRACTURING

CROSS-REFERENCE TO RELATED PATENT APPLICATIONS

This application claims the benefit of priority to U.S. Provisional Application Ser. No. 62/789,912, filed on Jan. 8, 2019, the contents of which are hereby incorporated by reference.

TECHNICAL FIELD

This disclosure relates to hydraulic fracturing operations.

BACKGROUND

Natural rocks are discontinuum materials due to the existence of various cracks, fractures, weak planes, or discontinuities (for example, a joint, foliation, schistosity, gneissosity, vein, dyke, bedding plane, or lamination). Due to the presence of discontinuities, natural rocks show anisotropy and heterogeneity, which affect the mechanical properties of rocks.

Oil and natural gas production in unconventional reservoirs depend on a stimulated rock volume (SRV) that is defined by the hydraulic fracture geometry (for example, height, length, and aperture). The growth of these fractures is controlled by the anisotropy and heterogeneity of the reservoir and its mineral composition. However, predicting the SRV can be difficult if the intended fracture height is reached during stimulation.

SUMMARY

Modeling the SRV is used to identify fraccable zones and fracture barriers (also referred to as "frac barriers") along the direction of a wellbore. Fraccable zones are the favorable propagation of hydraulically induced fractures. Fracture barriers, on the other hand, stop hydraulic fracture propagation, perhaps by dissipating the energy for propagating the fracture. Given the information provided by the SRV model, a more accurate model is better for more accurate engineering decisions, successful hydraulic fracturing operations, and improved business performance. Traditionally, a stress contrast profile is used for modeling the SRV. However, this approach has several limitations, particularly in complex formations.

The present disclosure is directed to a strength-based method for accurately modeling a formation to identify fracture barriers in the formation. The strength-based method is more accurate than the stress-based method, particularly in complex formations. Rather than generating a stress contrast profile, as is done in the stress-based method, the strength-based method generates a strength contrast profile based on rebound hardness values and mineralogy, which can be used to derive accurate indicators of the rock's mechanical properties. The strength contrast profile can be used to identify fracture barriers in the formation.

Aspects of the subject matter described in this specification may be embodied in methods that include operations for identifying fracture barriers in a well. The operations include converting rebound hardness values of a rock specimen from the well to unconfined compressive strength (UCS) values, where each of the rebound hardness values corresponds to a respective coordinate of a measurement grid imposed on the rock specimen. The operations further include, for each column of the grid, plotting the UCS values versus depth. Further, the operations include mapping, based on a maximum UCS value and a minimum UCS value, a relative strength contour plot for the rock specimen. Yet further, the operations include mapping, based on a fixed strength range, an absolute strength contour plot for the rock specimen. In addition, the operations include determining, based on the relative strength contour, the absolute strength contour, and mineralogy of the rock specimen, that the rock specimen is indicative of a fracture barrier in the well.

The previously-described implementation is implementable using a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium. These and other embodiments may each optionally include one or more of the following features.

In a first aspect, where the measurement grid is a square grid pattern, and further including: imposing the square grid pattern on the rock specimen; developing a coordinate system depending on mineral particle size distributions or data resolution of a device used to measure rebound hardness values; and measuring, at intersections in the square grid pattern, rebound hardness values of the rock specimen.

In a second aspect, wherein converting rebound hardness values of the rock specimen to UCS values includes: if the rock specimen is a ⅓ slab section core: using a first empirical calibration equation $y=3.7727e^{0.005x}$ to convert the rebound hardness values to UCS values, and if the rock specimen is a ⅔ butt section cores: using a second empirical calibration equation $y=2.1454e^{0.0058x}$ to convert the rebound hardness values to UCS values.

In a third aspect, further including: plotting, using UCS values and corresponding depths for a plurality of rock specimens from the well, a strength contrast profile for the well, wherein determining that the rock specimen is indicative of a fracture barrier in the well is further based on the strength contrast profile for the well.

In a fourth aspect, further including: applying a rock strength classification to the strength contrast profile to quantitatively classify the strength contrast profile.

In a fifth aspect, where the mineralogy of the rock specimen is a micro-X-ray fluorescence (µ-XRF) elemental map generated using µ-XRF analysis of the rock specimen.

In a sixth aspect, further including updating fracking parameters based on the fracture barrier.

The details of one or more implementations of the subject matter of this specification are set forth in the Detailed Description, the accompanying drawings, and the claims. Other features, aspects, and advantages of the subject matter will become apparent from the Detailed Description, the claims, and the accompanying drawings.

DESCRIPTION OF DRAWINGS

FIG. 7 is a strength contrast profile for identifying fracture barriers, according to some implementations of the present disclosure.

Like reference symbols in the various drawings indicate like elements.

DETAILED DESCRIPTION

Figure 1:
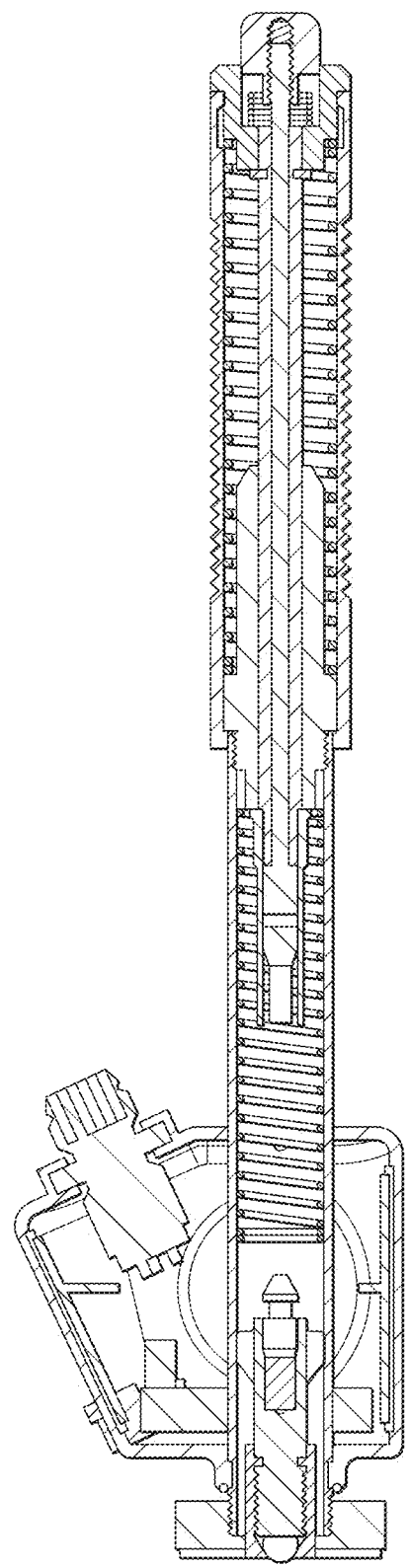
FIG. 1 is a schematic diagram of a rebound hardness tester, according to some implementations of the present disclosure.

Traditionally, hydraulic fracturing has employed a stress contrast profile generated by elastic properties (for example, Young's modulus and Poisson's ratio) for modeling a subsurface. When a stress contrast profile is generated, completion engineers input the profile into a fracture design software for modeling the dimension and geometry of hydraulically induced fractures. This approach detects fracture barrier regions where there is a threshold difference of minimum horizontal stress. This is based on the finding that energy for propagating a hydraulically induced fracture will dissipate when it meets a formation under a threshold minimum horizontal stress. Conversely, if a constant range of minimum horizontal stress continues throughout a formation, a hydraulically induced fracture can continue to propagate in different directions (for example, vertically and horizontally). There are at least two limitations with this approach.

First, the threshold stress contrast indicative of a fracture barrier varies based on different factors (for example, location, geological, stress, and structural conditions), but stress contrast profiles do not account for these factors. For example, a first formation that contains many thin beds of different lithology may have a greater stress contrast than a second formation that is divided by different rock types. In this example, a stress contrast of 3000-4000 pounds per square inch (psi) is indicative of a fracture barrier in the first formation, and a stress contrast less than 1000 psi is indicative of a fracture barrier in the second formation. As such, relative stress contrast is not clearly indicative of fracture barriers since the threshold or range may be different under different reservoir conditions.

A second limitation of the existing approach is that elastic properties indicate a rock's deformation, which is not an accurate indicator of the rock's mechanical properties. In rock mechanics, a rock's deformation is represented using Young's modulus and Poisson's ratio. Young's modulus defines a rock's resistance to axial stress and Poisson's ratio defines a rock's expansion to axial shrinkage when the rock is under axial stress. In hydraulic fracturing, Young's modulus is interpreted as the rock's sustainability of a fracture opened and Poisson's ratio is interpreted as an easiness by which the rock propagates a fracture. Generally, the greater the value of Young's modulus the better the fractures are opened, and the lesser the value of Poisson's ratio the better the fractures are propagated. However, these values are neither indicative of rock strength nor fracture toughness, which are better indicators of a rock's mechanical properties. Strength can be defined as a peak stress level at the point of rock failure. Strength can quantify how strong or weak a rock is in absolute terms (as opposed to relative terms, as in Young's modulus and Poisson's ratio). Fracture toughness can be defined as a rock's resistance to fracture extension. Under this definition, the greater the fracture toughness, the greater the amount of energy that is needed to propagate a fracture in a rock.

Due to its limitations, the existing approach cannot be accurately used to identify fracture barriers, particularly in unconventional formations. For example, unconventional formations, such as shales, can include ductile clay minerals. Such ductile rocks require more energy to initiate a crack, propagate a fracture, and sustain the resulting aperture. The existing approach would not accurately identify fracture barriers (due to the described limitations). Rather, as described in this disclosure, rock strength can be used to more accurately identify fracture barriers. However, measuring rock strength can be difficult in unconventional reservoirs.

The present disclosure is directed to a strength-based method that uses a rebound hardness test and mineralogy to identify fracture barriers in a formation. In an implementation, a slabbed rock sample is retrieved from a well. Non-destructive rebound hardness measurements are collected across the rock surface, which is specifically gridded, to provide an estimate of the rock strength. The collected rebound hardness values are converted into unconfined compressive strength (UCS) values. The UCS values are used to represent the rock's mechanical characteristics using, for example, contour maps mapped across the surface of the rock. The contour maps are correlated to the mineralogy of the rock surface, which is quantified and mapped using, for example, micro-X-ray fluorescence analysis. Using the mineralogy of the rock, the UCS can be correlated to the changing mineral content of the rock surface, which further facilitates an assessment of the strength of the rock surface.

Figure 2A:
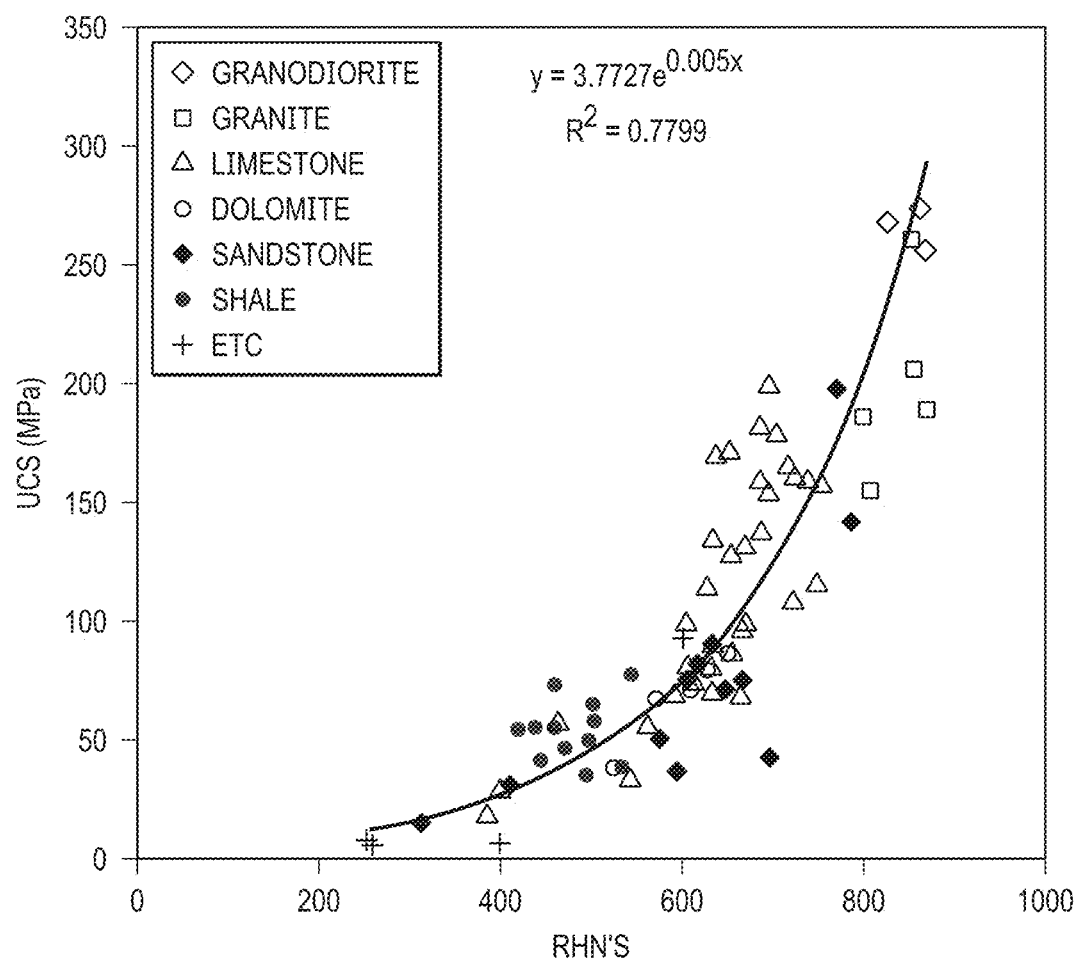
FIGS. 2A and 2B are plots of unconfined compressive strength (UCS) versus empirical rebound hardness values for ⅓ slab section cores and ⅔ butt section cores, respectively, according to some implementations of the present disclosure.
Figure 2B:
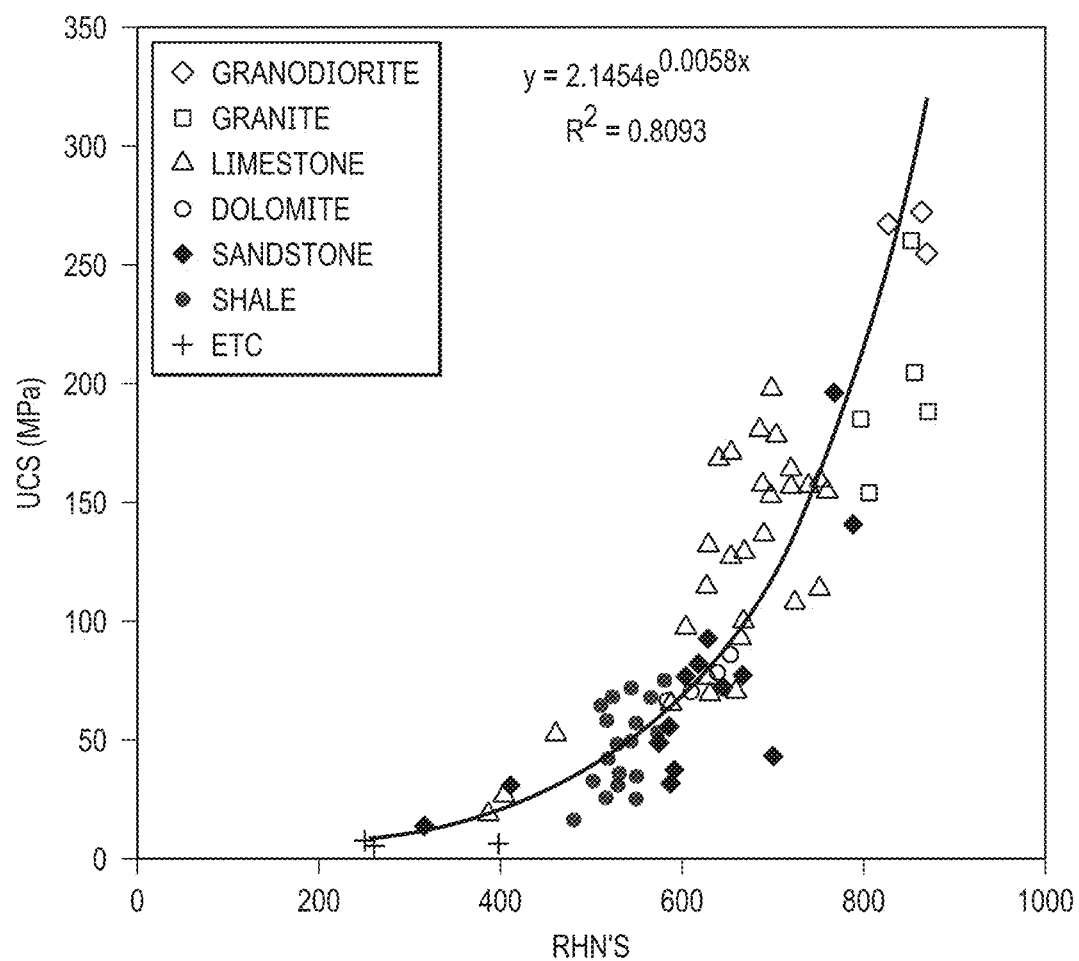

This non-destructive method addresses the challenge of relating core-scale measurements to reservoir-scale analysis to improve hydraulic fracturing designs in unconventional source rocks. For example, the method reveals differences in the rock strength, which is indicative of where fractures either propagate or fail due to fracture barriers. In some implementations, the method utilizes an Equotip® hardness tester (illustrated in FIG. 1), which was originally developed by Dietmar Leeb in the 1970s to measure rebound hardness numbers of metals. The unitless rebound hardness numbers can be converted to the corresponding UCS values using the empirical calibration equations developed for unconventional rocks. Example results of the conversion for different rock types and the empirical calibration equations are illustrated in FIGS. 2A and 2B. FIG. 2A illustrates the equation and results for ⅓ slab section cores, and FIG. 2B illustrates the equation and results for ⅔ butt section cores.

Figure 3:
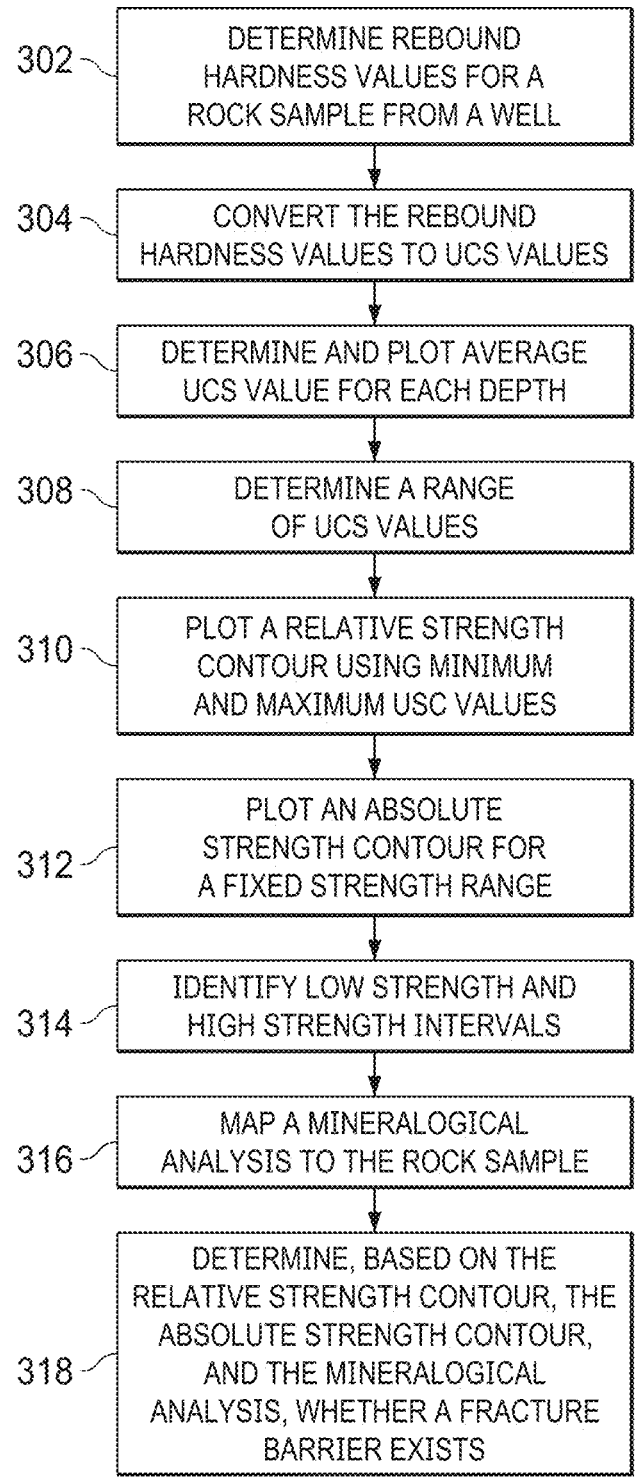
FIG. 3 is a flowchart of a method for identifying fracture barriers, according to some implementations of the present disclosure.

FIG. 3 is an example of a method 300 for identifying fracture barriers in a well, according to some implementations. For clarity of presentation, the description that follows generally describes method 300 in the context of FIGS. 1, 2A-2B, 4A-4G, 5A-5F, 6A-6G, 7, 8, and 9. However, it will be understood that process 300 may be performed, for example, by any other suitable system, environment, software, and hardware, or a combination of systems, environments, software, and hardware, as appropriate. In some implementations, various steps of process 300 can be run in parallel, in combination, in loops, or in any order.

Figure 4A:
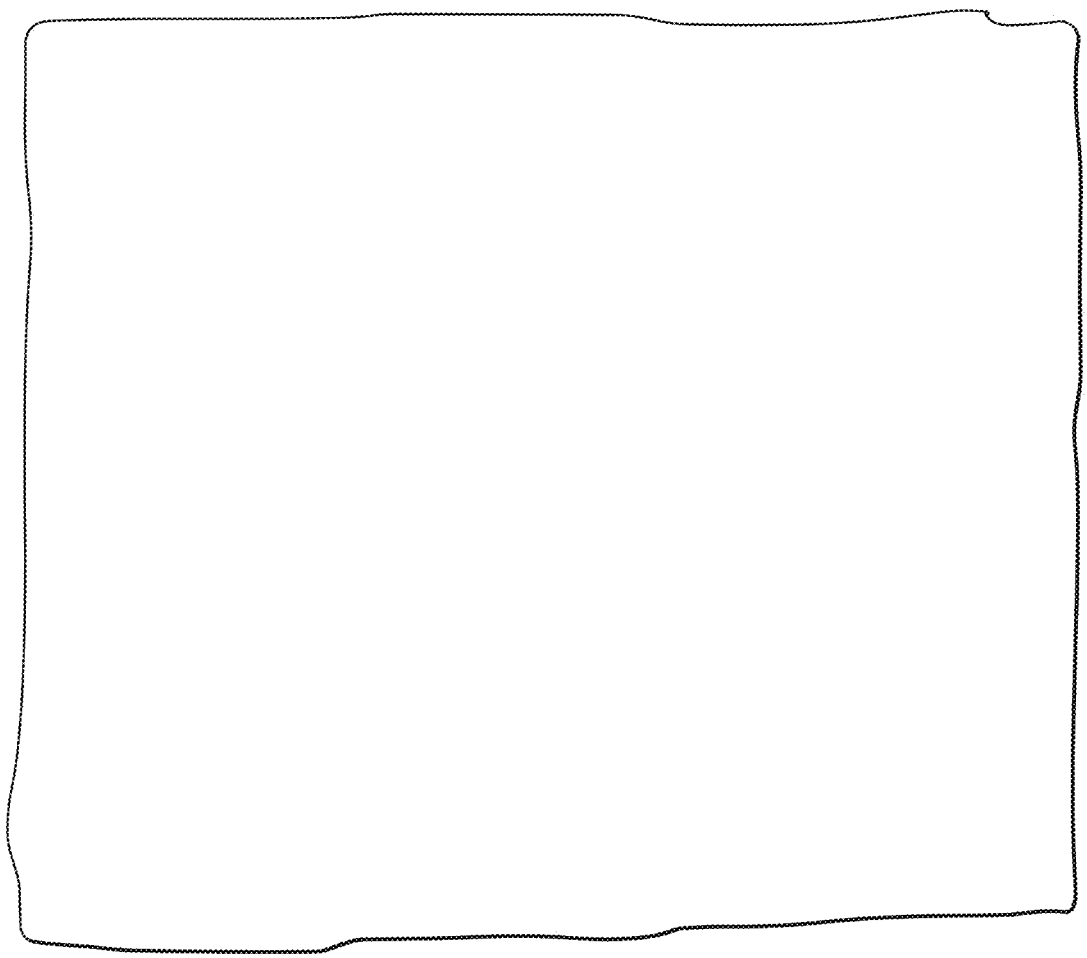
FIGS. 4A, 4B, and 4C are example images of preparing a rock sample and taking rebound hardness measurements of the rock sample, according to some implementations of the present disclosure.

Method 300 is described by applying the steps of the method to an example rock sample illustrated in FIG. 4A. FIGS. 4B-4G illustrate the steps of the method 300 applied to the rock sample of FIG. 4A.

Figure 4B:
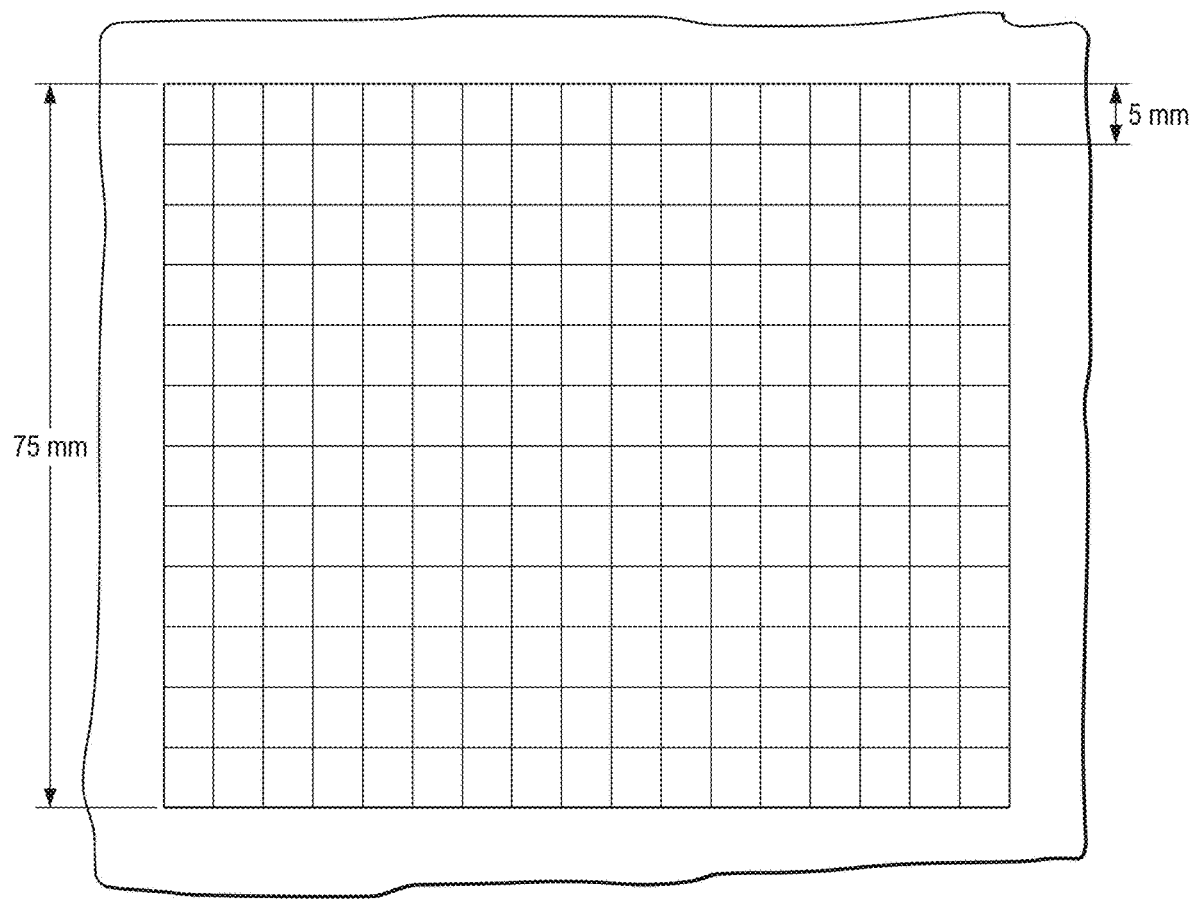
Figure 4C:
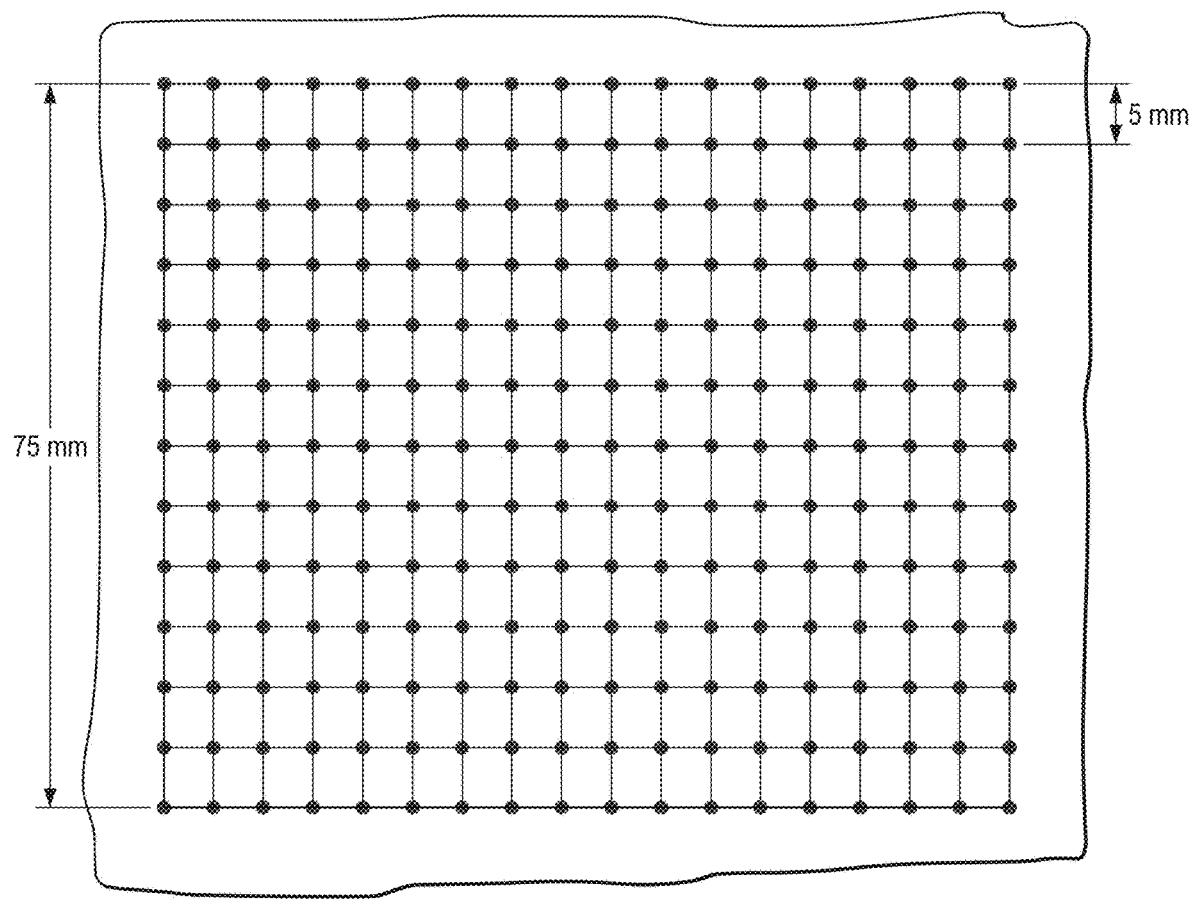

Method 300 begins at step 302 where rebound hardness values for a rock sample (illustrated in FIG. 4A) from the well are determined. In an implementation, a grid pattern is imposed on the rock sample and rebound hardness values are determined at each intersection of the grid pattern, as illustrated in FIGS. 4B and 4C. The grid pattern can form squares, rectangles, or other patterns without departing from the scope of the disclosure. As an example, the grid in FIG. 4B is a 5 millimeter (mm) by 5 mm square grid pattern. Accordingly, and as shown by the dents in FIG. 4C, the rebound hardness test is performed on the sample rock every 5 mm by 5 mm. In some implementations, the rebound hardness values are determined using, for example, an Equotip® hardness tester 100 illustrated in FIG. 1.

At step 304, the rebound hardness values are converted to UCS values. In an example, empirical calibration Equation (1) is used to convert the unitless rebound hardness numbers to UCS values for ⅓ slab section cores and empirical calibration Equation (2) is used for ⅔ butt section cores:

$$y=3.7727e^{0.005x}, \quad (1)$$

$$y=2.1454e^{0.0058x}. \quad (1)$$

Figure 4D:
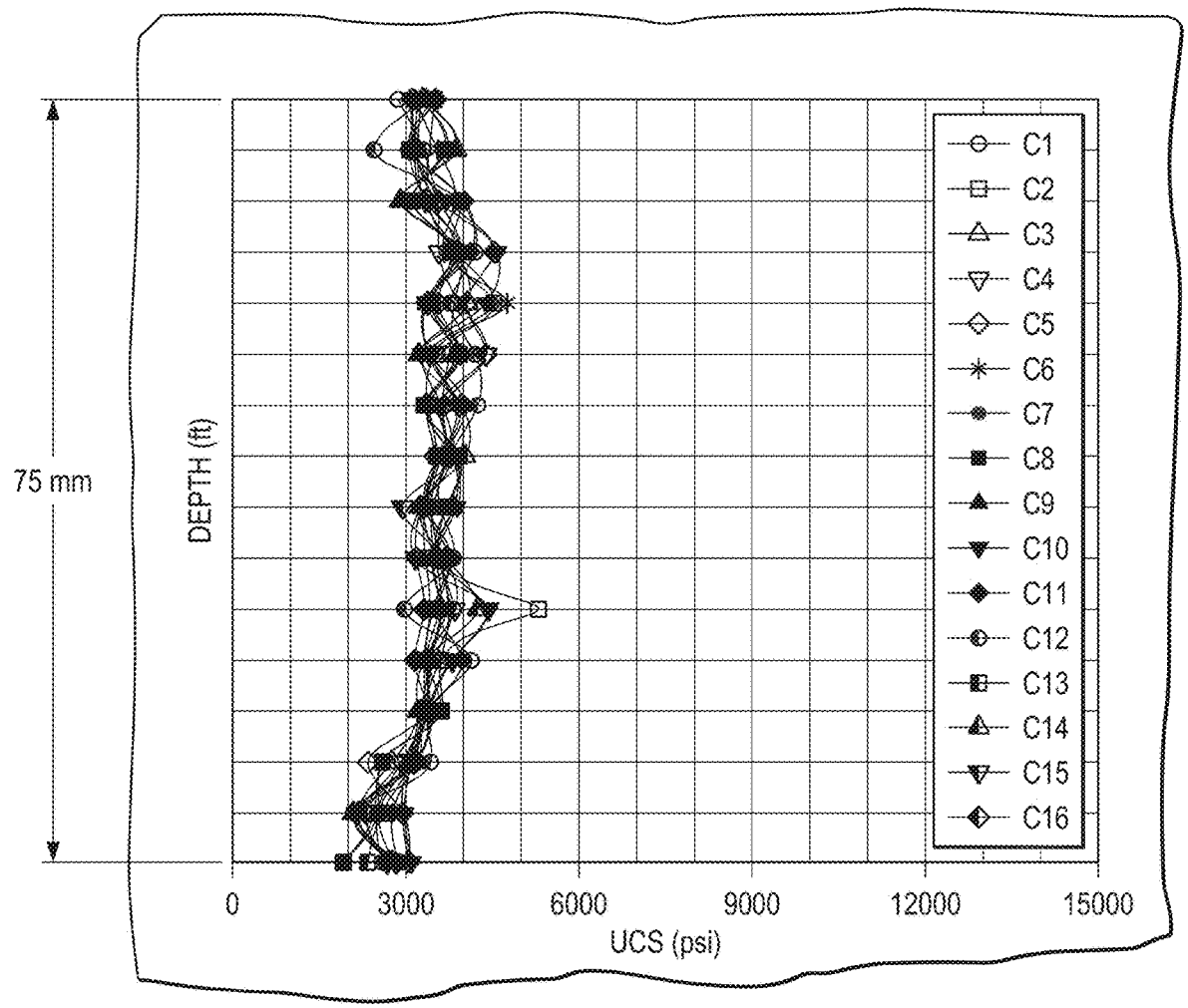
FIG. 4D is a plot of UCS values versus depth for the rock sample of FIG. 4A, according to some implementations of the present disclosure.

In Equations (1) and (2), x is the input rebound hardness values. The determined UCS values are then plotted versus depth. As described in this disclosure, the UCS plots are used to identify potential fracture barriers by identifying where the strength difference is dominant in the rock sample. FIG. 4D illustrates an example UCS values versus depth plot for each column in the grid of FIG. 4B.

TABLE 1

Engineering Classification of Rock by Strength

| Classification | UCS (MPa) | Examples |
|---|---|---|
| Extremely weak | <1 | Stiff fault gauge |
| Very weak | 1-5 | Highly weathered or altered rock, shale |
| Weak | 5-25 | Chalk, claystone, potash, marl, siltstone shale, rock salt |
| Medium strong | 25-50 | Concrete, phyllite, schist, siltstone |
| Strong | 50-100 | Limestone, marble, sandstone, schist |
| Very strong | 100-250 | Amphibolite, sandstone, basalt, gabbro, gneiss, granodiorite, peridotite |
| Extremely strong | >250 | Fresh basalt, chert, diabase, gneiss, |

TABLE 1-continued

Engineering Classification of Rock by Strength

| Classification | UCS (MPa) | Examples |
|---|---|---|
| | | granite, quartzite |

Figure 4E:
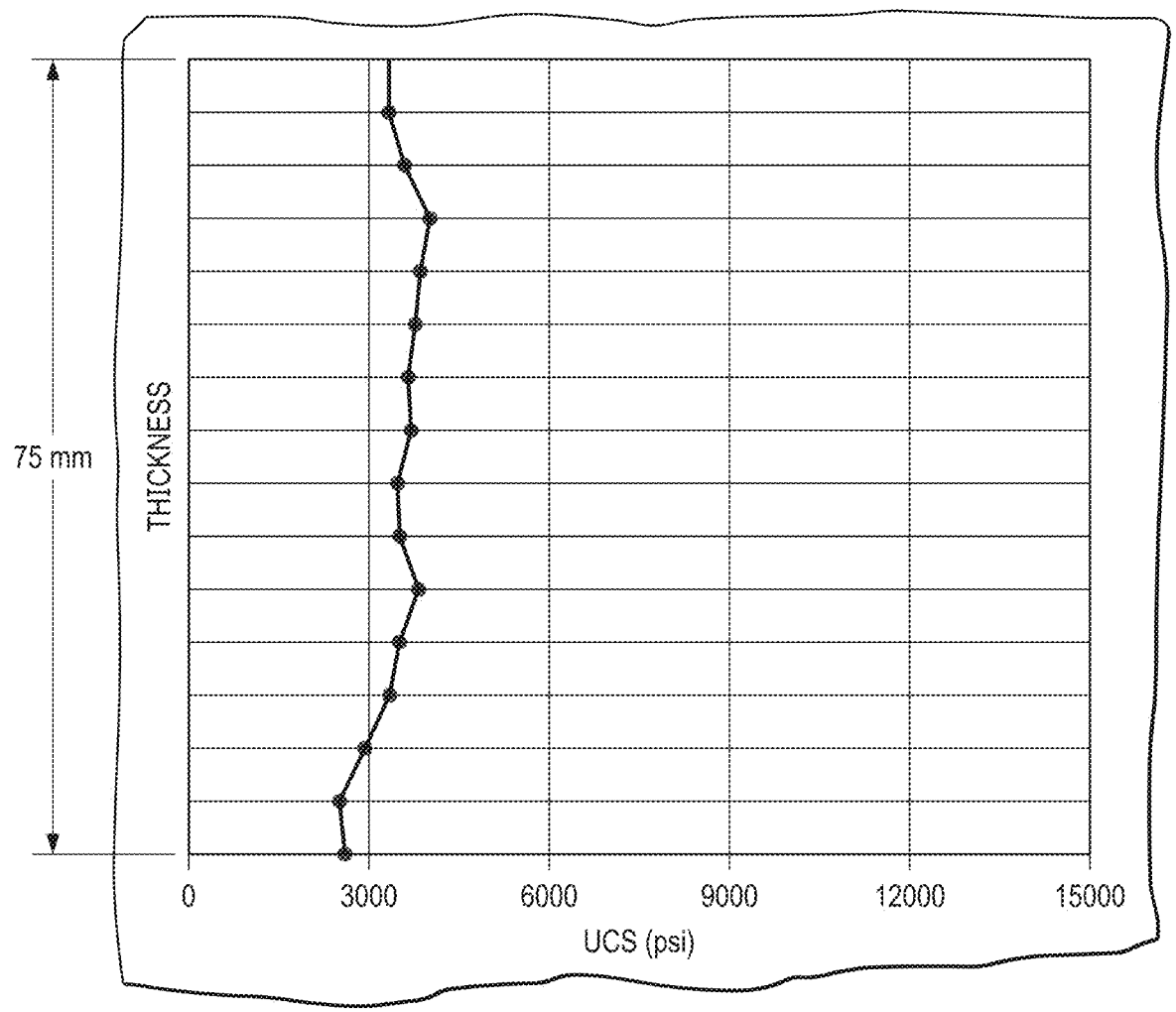
FIG. 4E is a plot of average UCS values versus depth for the rock sample of FIG. 4A, according to some implementations of the present disclosure.

At step 306, and as illustrated in FIG. 4E, the average UCS value for each depth is determined and plotted. In this example, the UCS values vary between about 2500 psi and 4000 psi, which indicates a very low level of strength according to the engineering classifications (based on UCS values) of intact rocks. Example engineering classification tables are shown in Table 1 and Table 2. The rock strength classification shown in these tables is used to quantitatively classify the UCS values.

TABLE 2

Uniaxial Compressive Strength

| Class | Level of Strength | MPa | psi |
|---|---|---|---|
| A | Very high | Over 220 | 32,000 |
| B | High | 110-220 | 16,000-32,000 |
| C | Medium | 55-110 | 8,000-16,000 |
| D | Low | 27.5-55 | 4,000-8,000 |
| E | Very low | Less than 27.5 | 4000 |

At step 308, a range of UCS values is determined. In an example, the range of UCS values is determined by determining minimum and maximum UCS values. In another example, the range of UCS values is determined by determining a minimum average UCS value and a maximum average UCS value.

Figure 4F:
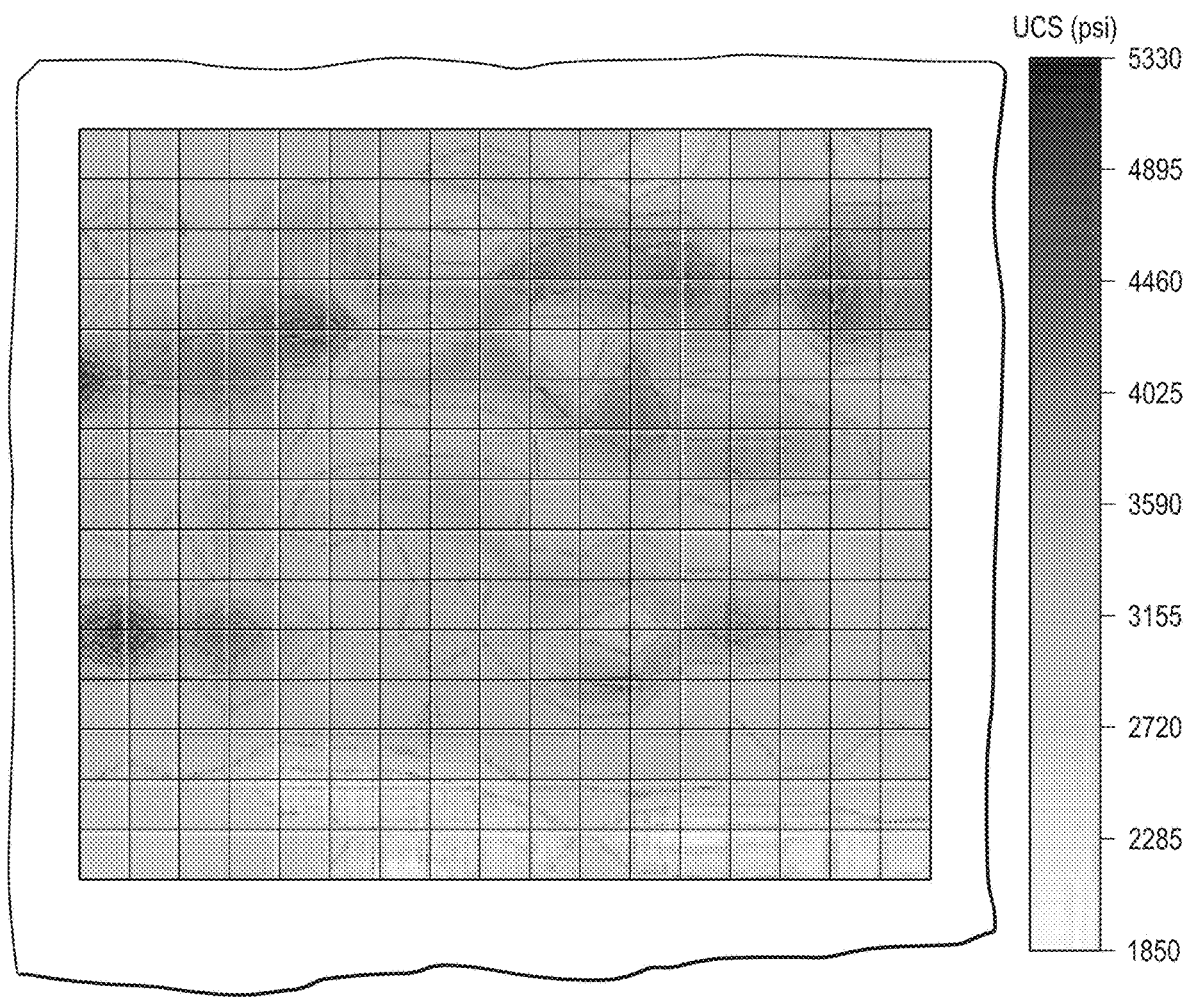
FIG. 4F is a relative strength contour plot for the rock sample of FIG. 4A, according to some implementations of the present disclosure.

Next, at step 310, a relative strength contour is plotted using the minimum and maximum UCS values. In an implementation, the relative strength contour maps the strength range between the minimum and maximum values for the rock sample. In the example relative strength contour illustrated in FIG. 4F, the maximum and minimum UCS values are determined from the values plotted in FIG. 4D. As shown in FIG. 4D, the maximum and minimum UCS values in this example are 5330 psi and 1850 psi, respectively. In FIG. 4F, the relative strength contour is plotted using this range, perhaps using color or shading coding (for example, lower strengths are depicted in blue and greater strengths are depicted in red).

The advantage of the relative strength contour is to visualize strength contrasts in each rock sample that is collected. However, relative strength contours highlight the contrast with different amounts of strength from different samples (since different samples have different maximum and minimum UCS values). When the results from all samples in a well need to be compared, the respective relative strength contour of each sample does not provide a reference for comparison due to the case-by-case results.

Figure 4G:
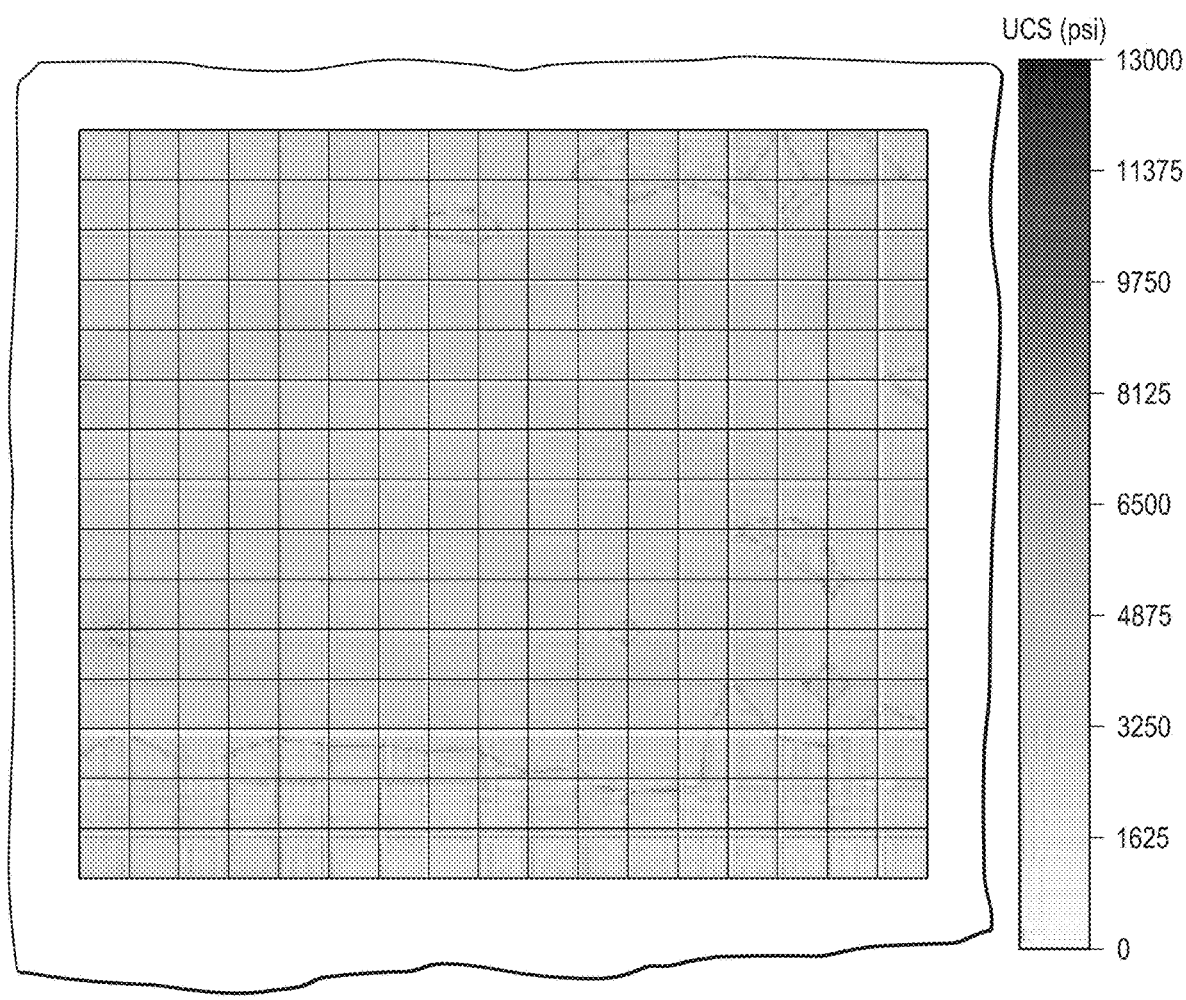
FIG. 4G is an absolute strength contour plot for the rock sample of FIG. 4A, according to some implementations of the present disclosure.

In order to overcome the limitation of the relative strength contour, at step 312, an absolute strength contour is plotted for a fixed strength range. The absolute strength contour for a well is based on a global scale. As such, the absolute strength contour resolves the disadvantage of the relative strength contour. FIG. 4G illustrates an example absolute strength contour. In this example, the absolute strength contour is mapped at a fixed range between 0 to 13,000 psi. Given that the UCS values for the rock sample are mapped at the global scale, the UCS values for the rock sample can be compared to other UCS values for other rock samples collected from the well. In the example of FIG. 4G, 13,000 psi is a maximum that was selected based on the finding that UCS values of rock specimens generally do not exceed this value. If other rock samples at a different location show greater UCS values, then the upper limit will be increased. Contrarily, if rock samples at another location have much lower UCS values, the upper limit will be decreased. This is because the relative strength contour contrasts the difference in the strength at each case (each sample).

The advantage of the absolute strength contour is that the results of all the samples from a well can be compared with a clear and constant condition. However, absolute strength contours do not depict a weak contrast when a rock has a lower strength range, but the contrast is shown in a relative strength contour for the rock. Therefore, it is important to use both the relative and the absolute strength contour plots to understand the strength on a local and global scale in a well.

At step 314, low strength and high strength intervals are identified. In an implementation, the relative strength contour and the absolute strength contour are analyzed for low strength and high strength intervals. In an example, a high strength interval (for example, greater than a threshold) is indicative of a fracture barrier. In another example, a clear boundary between a high strength contrast interval and a low strength contrast interval is indicative of a fracture barrier. That is, there is a significant strength contrast (for example, greater than a threshold) across the clear boundary. Another feature indicative of a fracture barrier is a region of substantial thickness (for example, greater than a threshold) of both high and low strength intervals. Thus, in some examples, thickness of the intervals may be determined.

At step 316, a mineralogical analysis is mapped to the rock sample. In an implementation, the mineralogical analysis is a micro-X-ray fluorescence (µ-XRF) analysis of the rock sample that generates a µ-XRF elemental map. The µ-XRF elemental map is indicative of mineral types and respective amounts of the mineral types for a measurement area. In an example, the measurement area for the mineralogical analysis is identical to the measurement area that was used for the rebound hardness test (for example, a 5 mm by 5 mm square grid). In some implementations, elemental maps can be used to quantify and map mineralogy and organic matter in source rocks at the nanometer scale. The mineralogical analysis addresses the challenge of using pore-scaled and core-scaled analysis to predict reservoir properties. Thus, it pursues the non-destructive quantification of the mineral matrix that can be used to determine rock properties of the reservoir. In short, it can quantify mineralogy at the core scale for identifying fracture barriers with the combination of rebound hardness test.

At step 318, based on the relative strength contour, the absolute strength contour, and the mineralogical analysis of the rock sample, a determination is made whether a fracture barrier exists. In an example, the relative strength contour is analyzed for any features indicative of fracture barriers (for example, a significant strength contrast). The relative strength contour assists in identifying fracture barriers at each specific depth at a local scale. In the example of FIG. 4F, the relative strength contour does not include any strength-based features indicative of a fracture barrier. As such, the relative strength contour of FIG. 4F is indicative of a fraccable interval because a fracture barrier is not detected. Similarly, the absolute strength contour of FIG. 4G does not include any strength-based features indicative of a fracture barrier. As result, the absolute strength contour of FIG. 4G confirms that the rock sample is indicative of a fraccable interval because a fracture barrier is not detected in the rock sample.

In an implementation, the mineralogical analysis is used as an additional assessment of the strength of the rock sample. By way of example, a strong mineral of calcite can be distributed along a certain horizontal layer with substantial thickness, which contributes to an abrupt increase in rock strength. As a result, there is a substantial strength contrast above and below this layer, which results in this layer becoming a fracture barrier. As will be illustrated in the examples of FIGS. 5 and 6, a mineralogical analysis of a rock sample can be used jointly with the relative and absolute strength contours to identify fracture barriers.

FIGS. 5A-5F (collectively referred to as FIG. 5) and FIGS. 6A-6G (collectively referred to as FIG. 6) illustrate two examples of identifying fracture barriers in respective wells using respective rock samples from the wells. In an implementation, the method 300 of FIG. 3 is applied to the respective rock samples. In both examples, it is determined that the respective rock sample has a significant strength contrast based on the following observations from the results applying the method 300 to the rock samples. First, there is a clear boundary between high and low strength intervals in the strength contours of the rock samples. Second, there is a significant strength contrast of nearly 6000 psi between the high and low strength intervals. Third, both the high and low strength intervals have a substantial thickness.

Figure 5A:
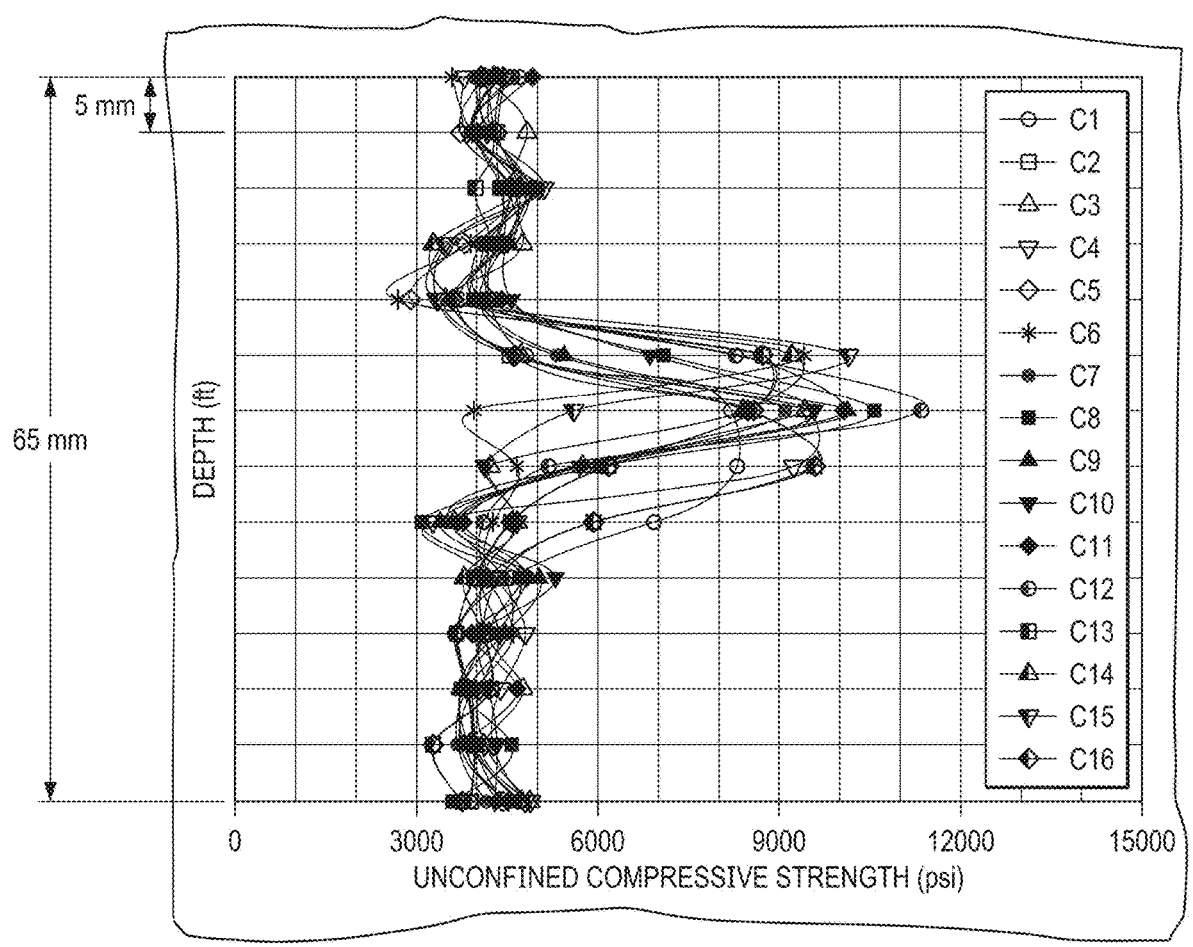
FIGS. 5A, 5B, 5C, 5D, 5E, and 5F illustrate an example of identifying a fracture barrier in a rock sample, according to some implementations of the present disclosure.
Figure 5B:
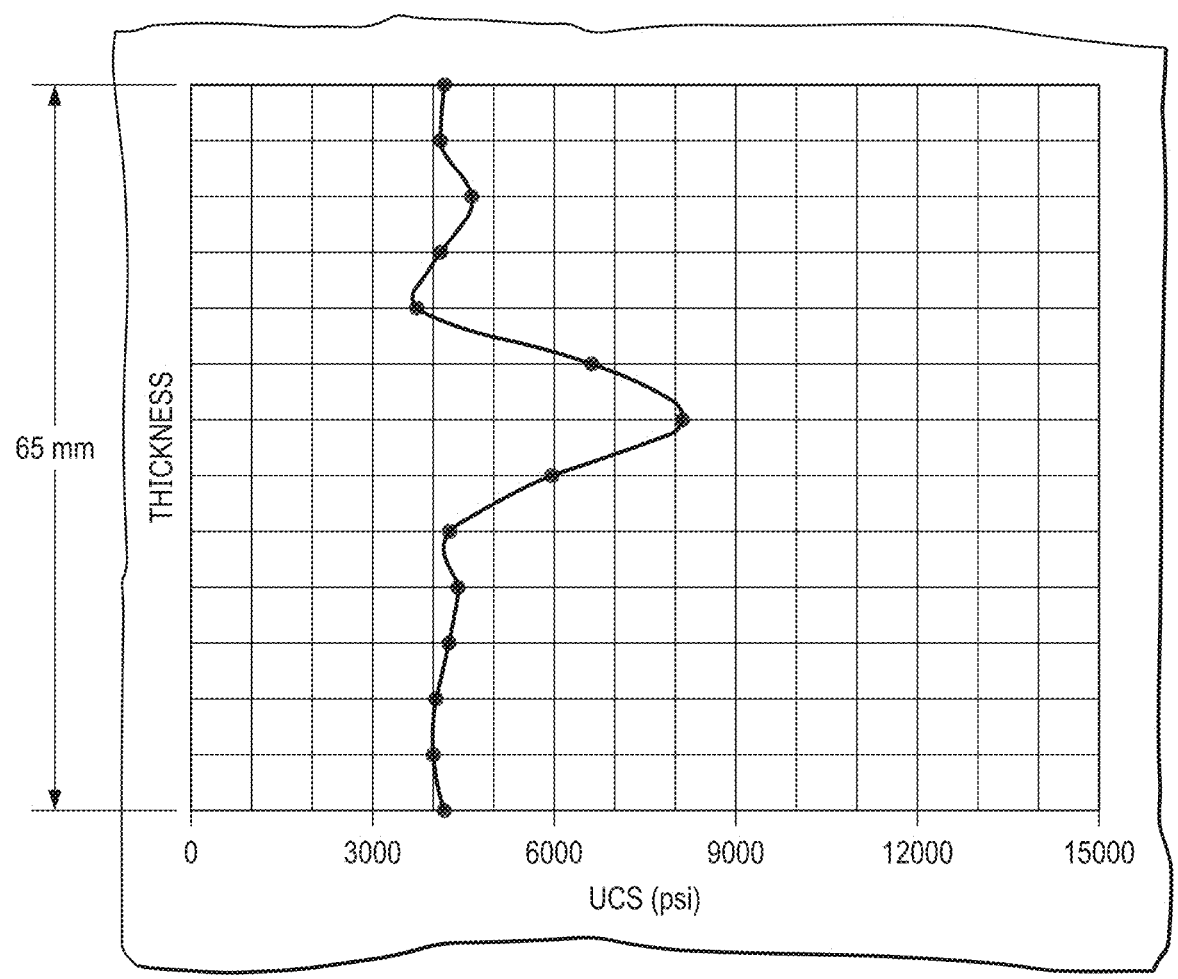
Figure 5C:
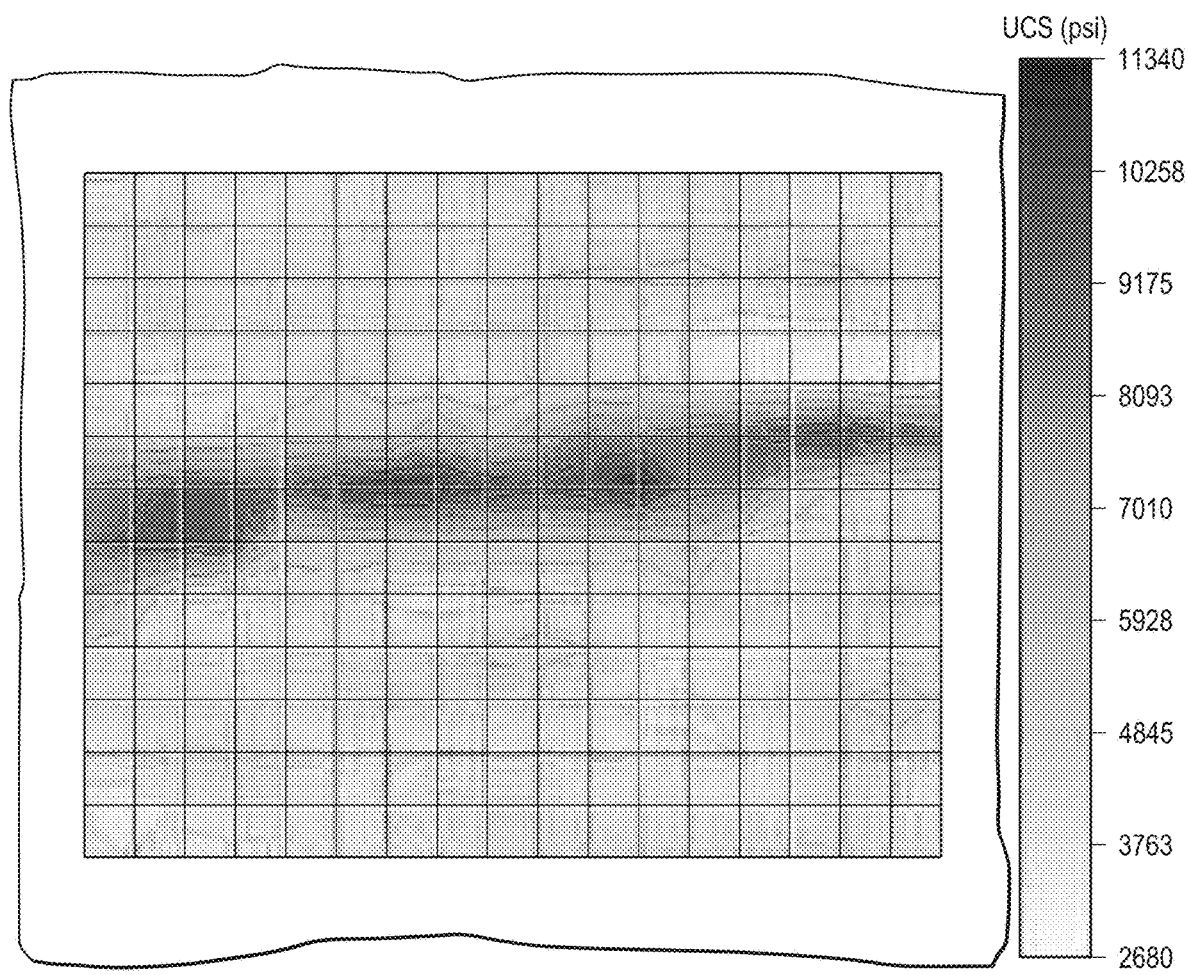
Figure 5D:
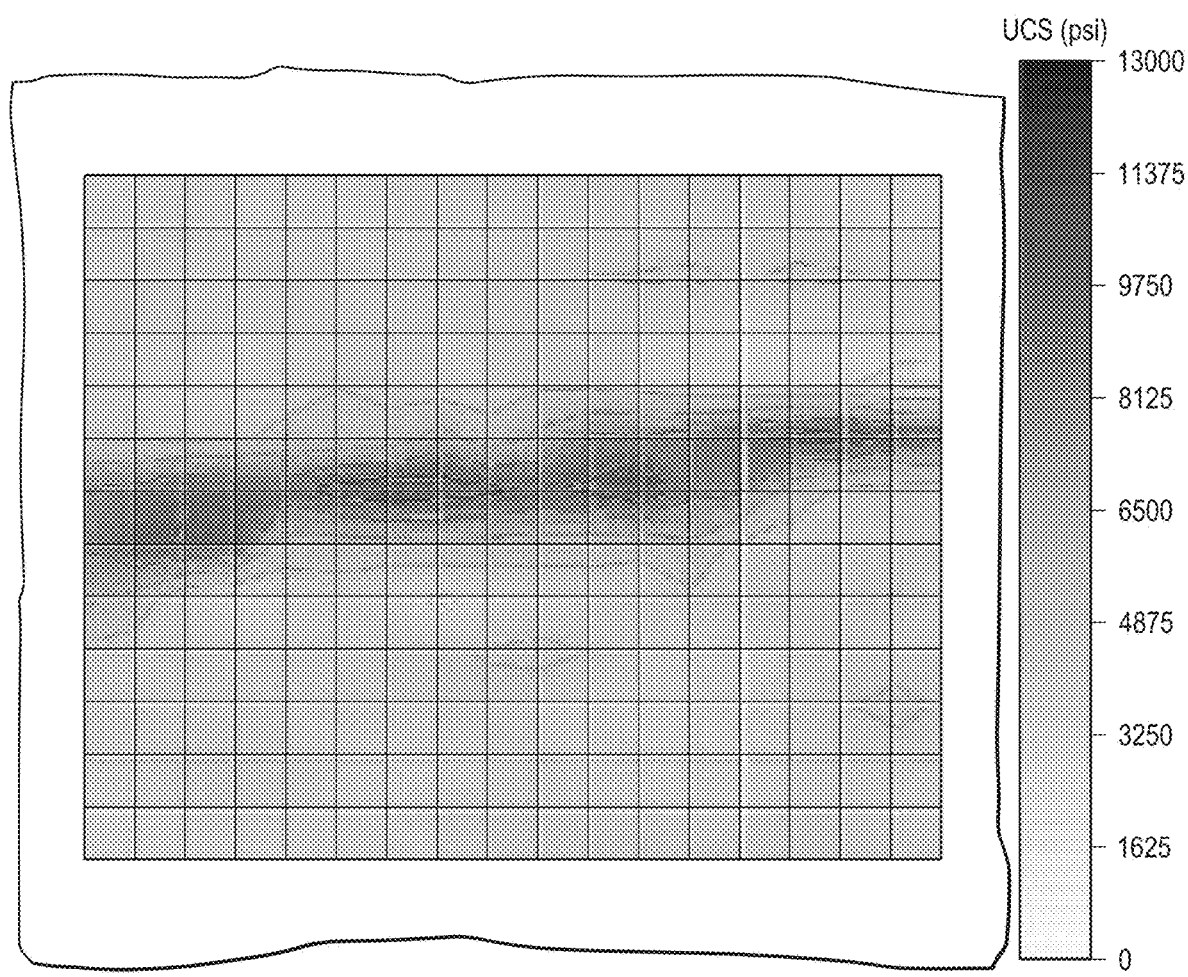

Starting with the example of FIG. 5, FIGS. 5A-5D illustrate results that are generated based on the rebound hardness test. FIG. 5A illustrates a plot of the UCS for each column versus depth for the rock sample. FIG. 5B illustrates a plot of the average UCS at each depth of the rock sample. FIG. 5C illustrates a relative strength contour for the rock sample, and FIG. 5D illustrates an absolute strength contour for the rock sample.

As described previously, the relative strength contour and the absolute strength contour can be used to identify a frac barrier in a well. In particular, the relative strength contour is analyzed to determine whether a strength contrast exists locally in the rock sample. In an implementation, a strength contrast is identified in the relative strength contour by analyzing a color-coded (or shade intensity coded) relative strength contour plot for a threshold strength contrast. The threshold strength contrast can be identified manually be a user or can be identified automatically by a computing device by comparing strength contrasts to a predetermined threshold (for example, provided by a user). In an example, the predetermined threshold is 3000 psi at closely located mineralogical layers or geological structures. In the example of FIG. 5, the strength contrast is identified by detecting a strength difference (contrast) greater than 3000 psi at closely located mineralogical layers or geological structures. Note that the predetermined threshold can be a value other than 3000 psi. Once the threshold strength contrast is identified locally, the absolute strength contour is analyzed to determine how the locally identified strength contrast compares on a global scale (that is, compared to other samples collected from the well). For example, the strength contrast is compared to the global scale (of the well) by analyzing a color-coded (or shade intensity coded) absolute strength contour plot for a threshold strength contrast, which can be identified manually by a user or can be identified automatically by a computing device by comparing strength contrasts to a predetermined threshold.

Additionally, a mineralogical analysis is performed on the rock sample. In an example, the mineralogical analysis is performed on the frac barrier that was identified using the rebound hardness test. As explained previously, the mineralogical analysis can be used to confirm that the frac barrier identified using the rebound hardness test is in fact a frac barrier. Alternatively, the mineralogical analysis can be used to characterize the frac barrier.

Figure 5E:
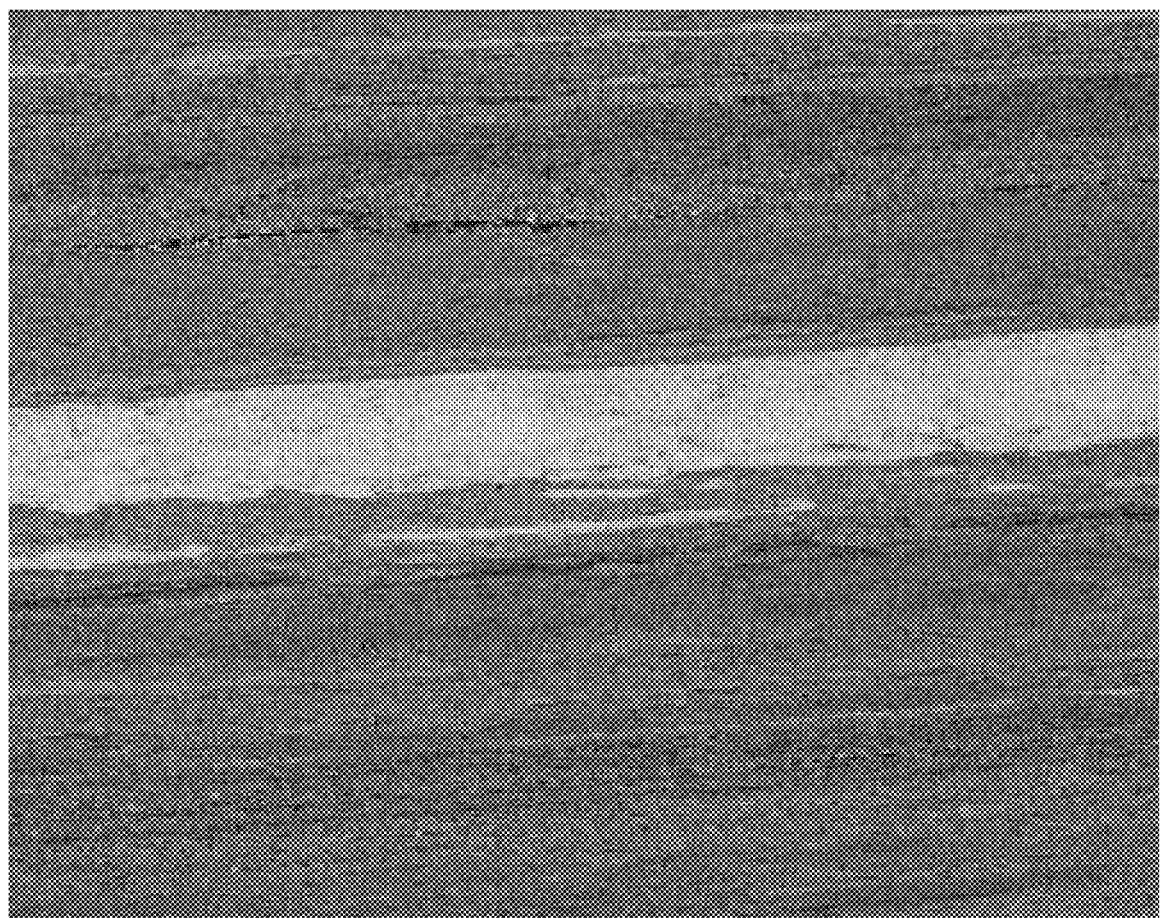
Figure 5F:
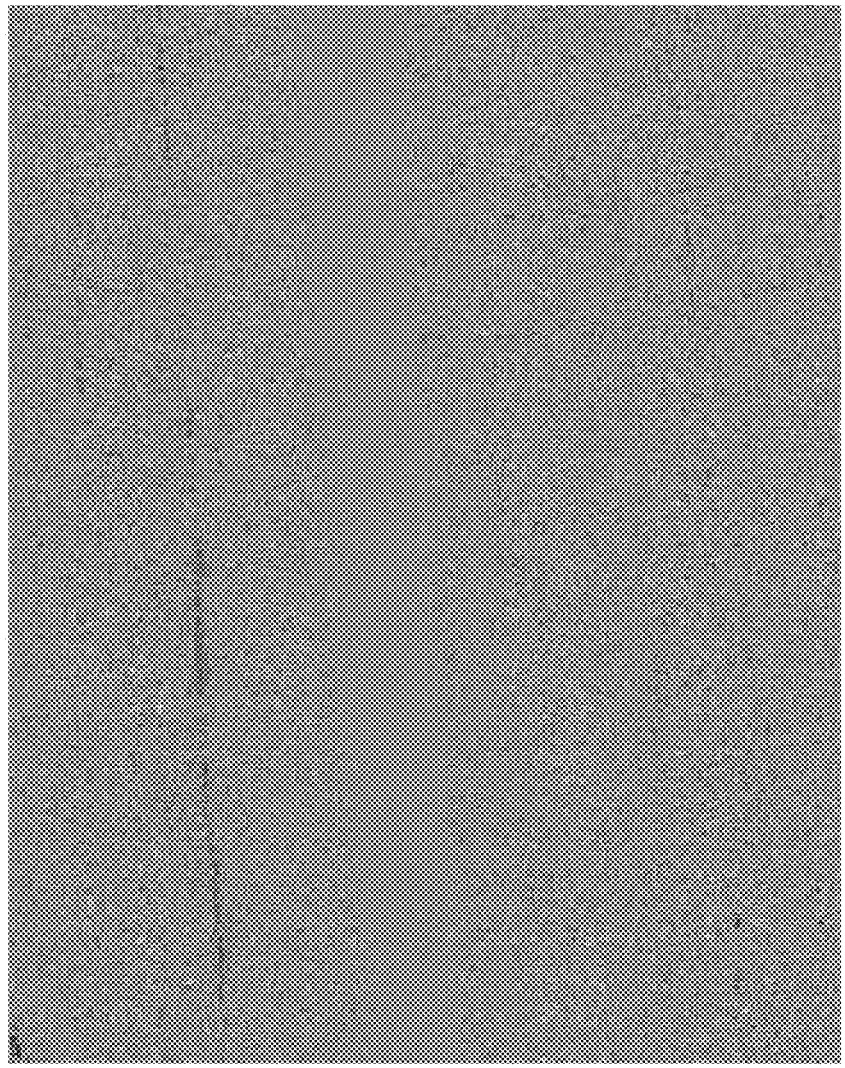

FIG. 5E and FIG. 5F illustrate the mineralogical analysis. In particular, FIG. 5E shows a calcite vein (that is, a boundary) with a thickness of over 10 mm found in the rock sample. In an implementation, an X-ray diffraction (XRD) analysis is performed on the calcite vein of FIG. 5E. FIG. 5F illustrates the results of the XRD analysis. As shown in FIG. 5F, the XRD analysis indicates that the calcite vein is 90% calcite, which is a brittle mineral. This analysis determined that a strong mineral of calcite is distributed along a certain horizontal layer with substantial thickness (for example, greater than 10 mm). The calcite contributed to the abruptly increasing the rock strength. As a result, there is a substantial strength contrast above and below this layer, further indicating that the identified layer is a frac barrier.

Figure 6A:
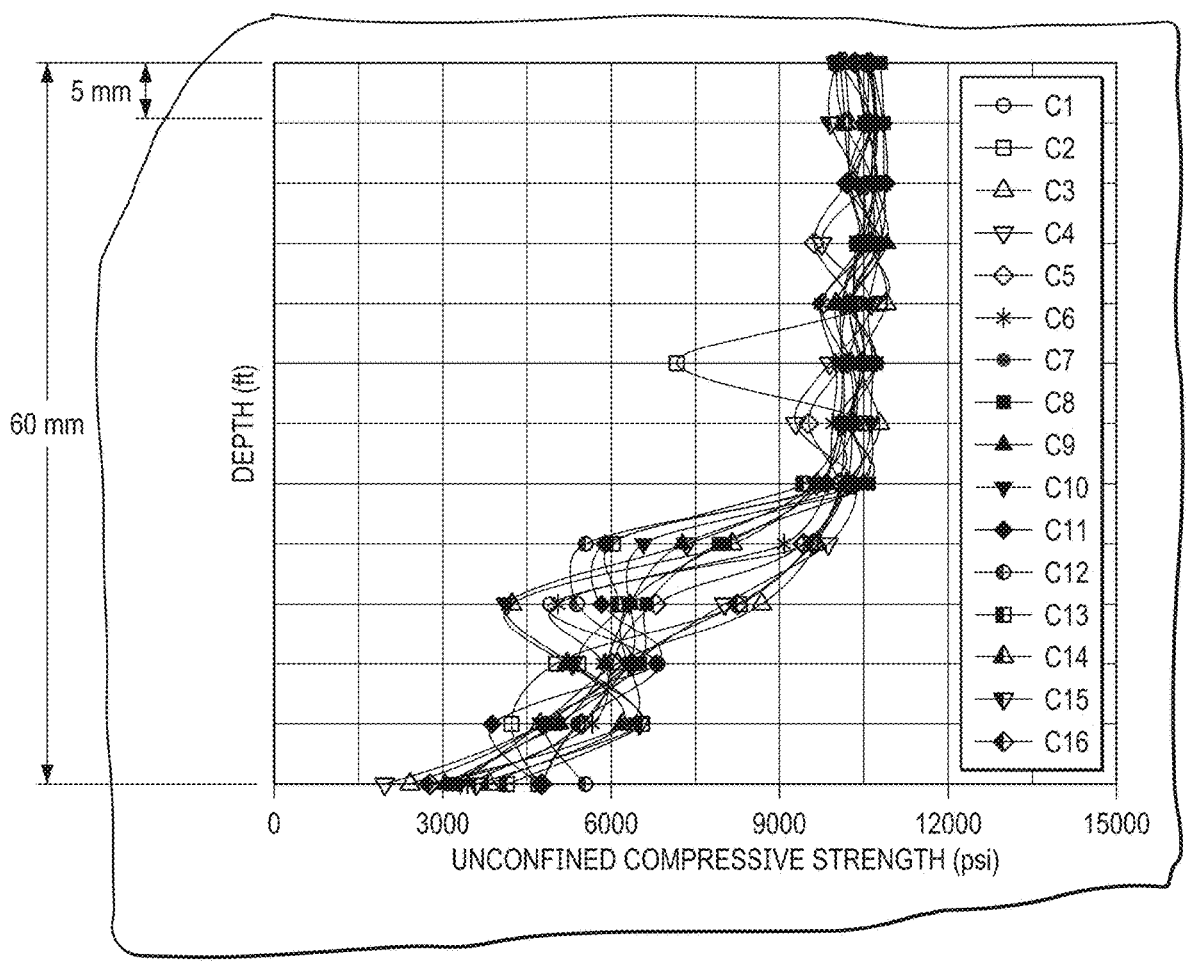
FIGS. 6A, 6B, 6C, 6D, 6E, 6F, and 6G illustrate another example of identifying a fracture barrier in a rock sample, according to some implementations of the present disclosure.
Figure 6B:
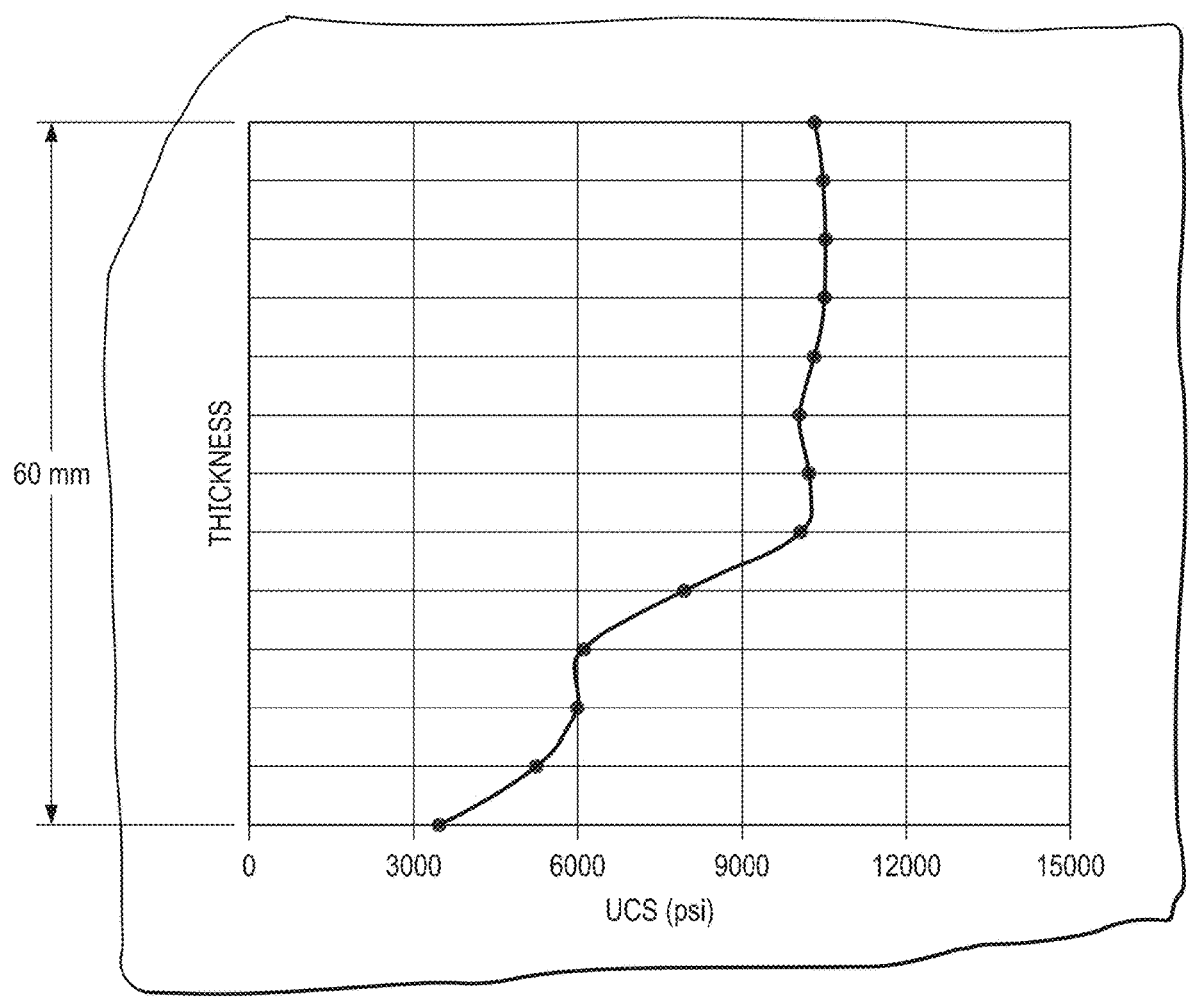
Figure 6C:
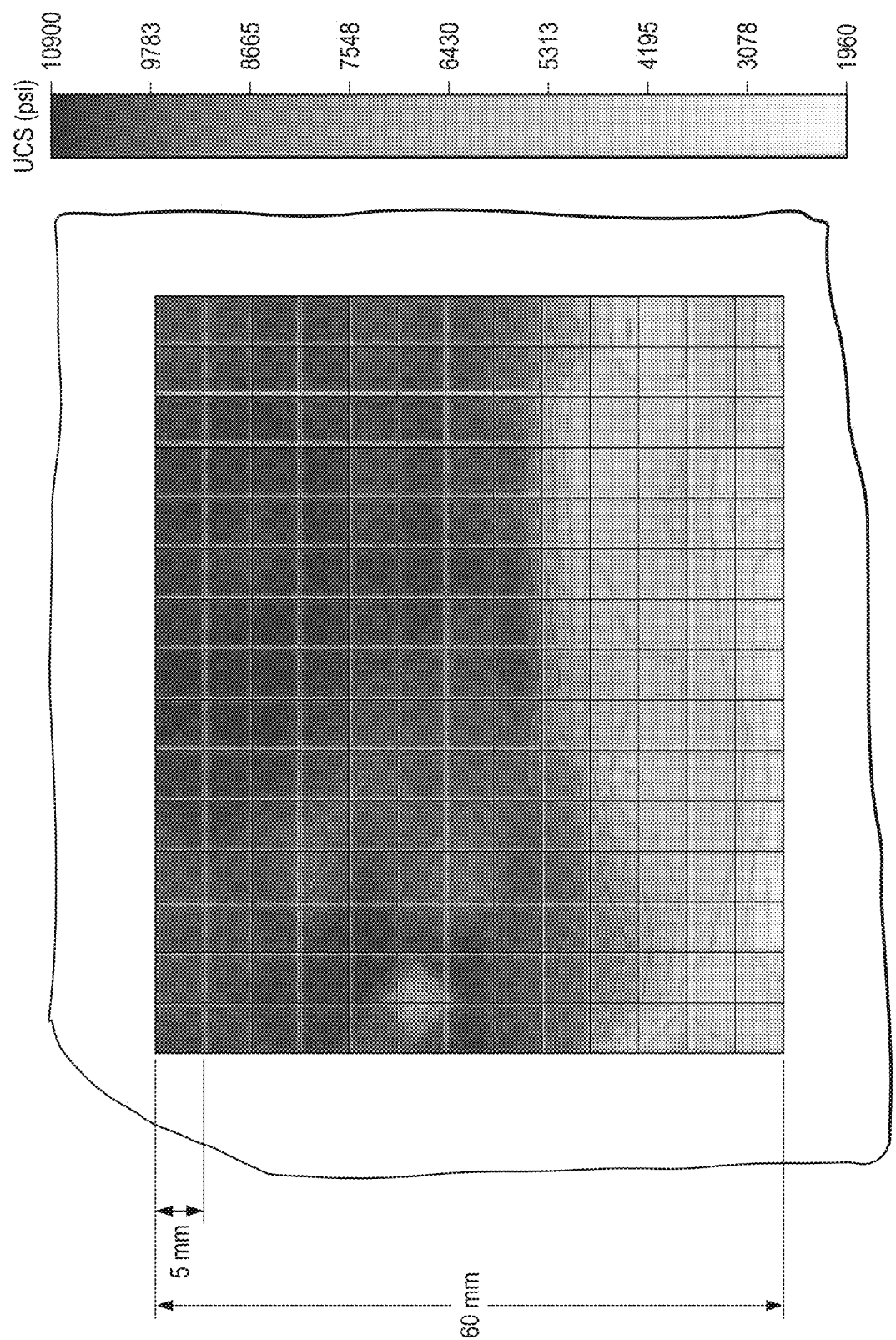
Figure 6D:
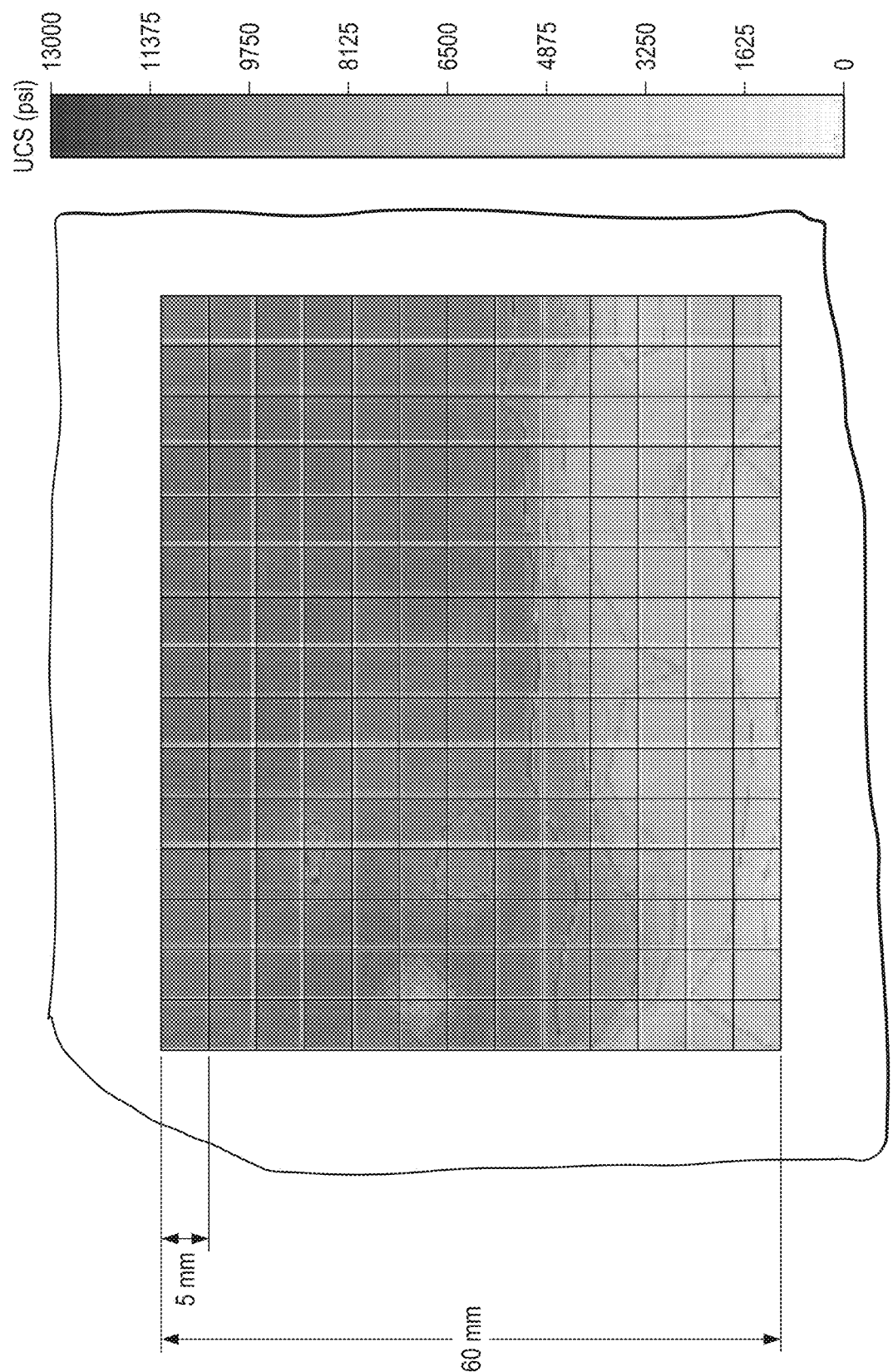

Turning to the example of FIG. 6, FIG. 6A-6D illustrate results that are generated based on the rebound hardness test. FIG. 6A illustrates a plot of the UCS values for each column in the specimen, and FIG. 6B illustrates a plot of the average UCS at each depth of the specimen. FIG. 6C illustrates a relative strength contour map of the rock specimen, and FIG. 6D illustrates an absolute strength contour map of the rock specimen. As described in the example of FIG. 5, the relative strength contour map and the absolute strength contour map can be used to identify a fracture barrier.

Figure 6E:
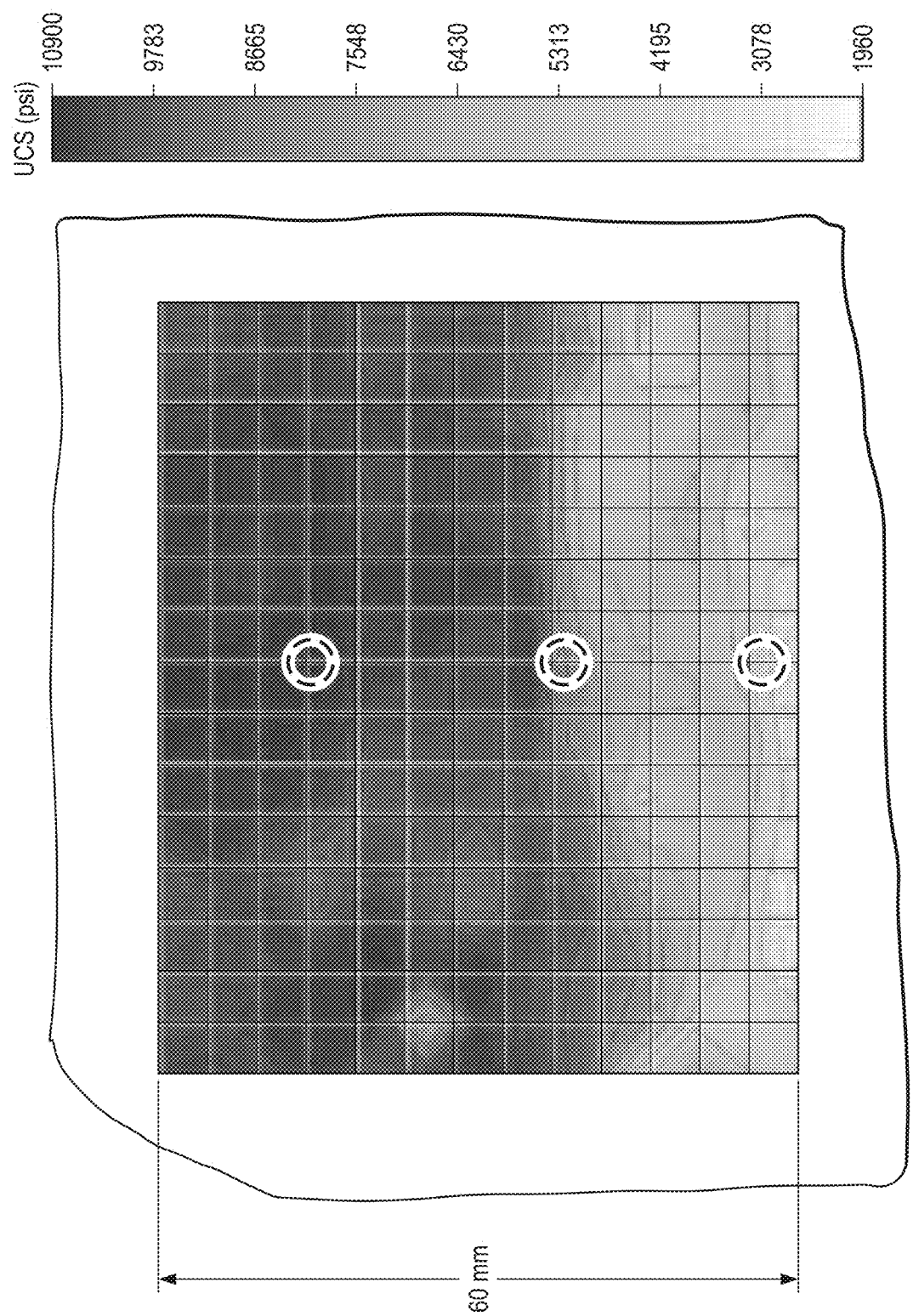
Figure 6F:
Figure 6G:
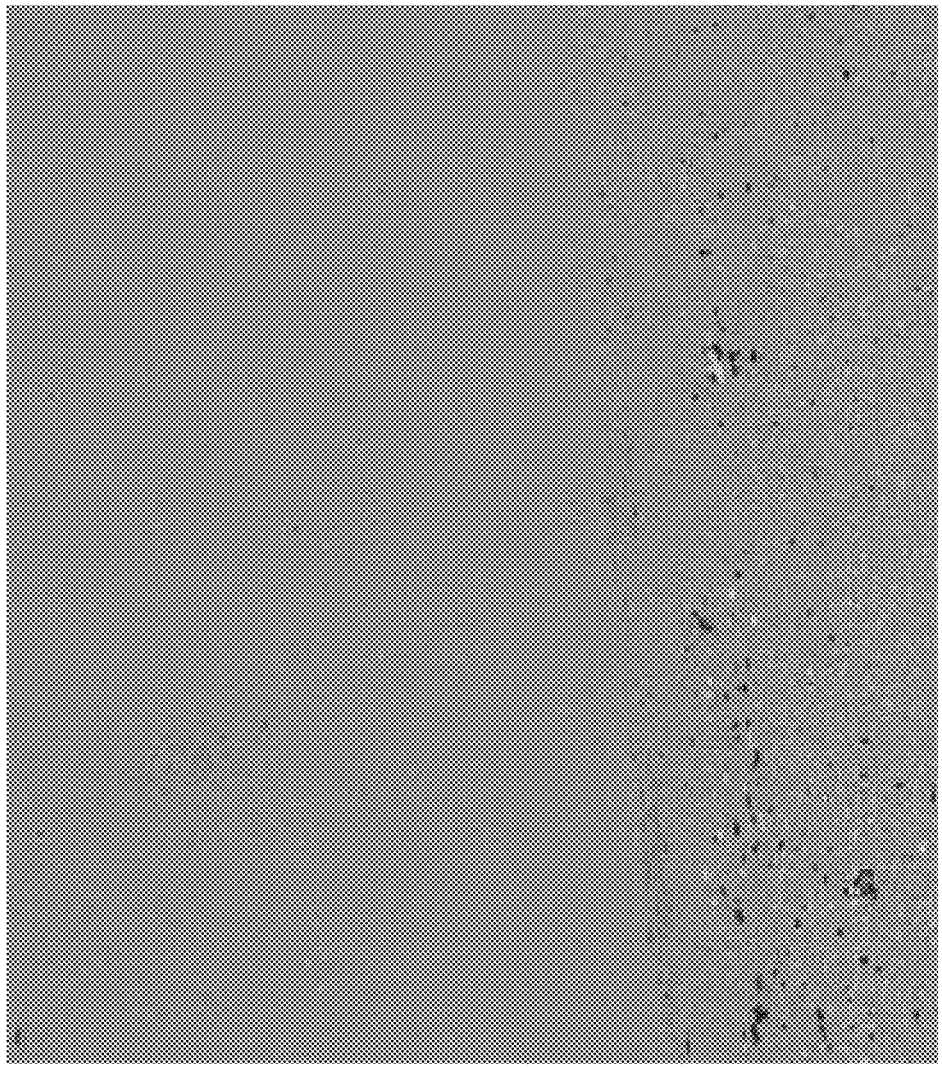

Additionally, a mineralogical analysis can be performed on the rock sample. In this example, an XRD analysis was conducted at three points, as shown in FIG. 6E. This analysis directly correlates the XRD results with the individual UCS at the same spot. In an example, the spots can be selected at three different levels of UCS values, such as a greater strength spot, a transition strength spot, and a lower strength spots. Doing so facilitates investigating the different mineral compositions and comparing them at the three different levels. FIG. 6F illustrates a scan of the rock sample that shows that the rock sample includes a boundary between different minerals, which results in the contrast of strength. The XRD analysis depicted in FIG. 6G indicates that the mineral composition of the frac barrier is 94.7% calcite.

Figure 8:
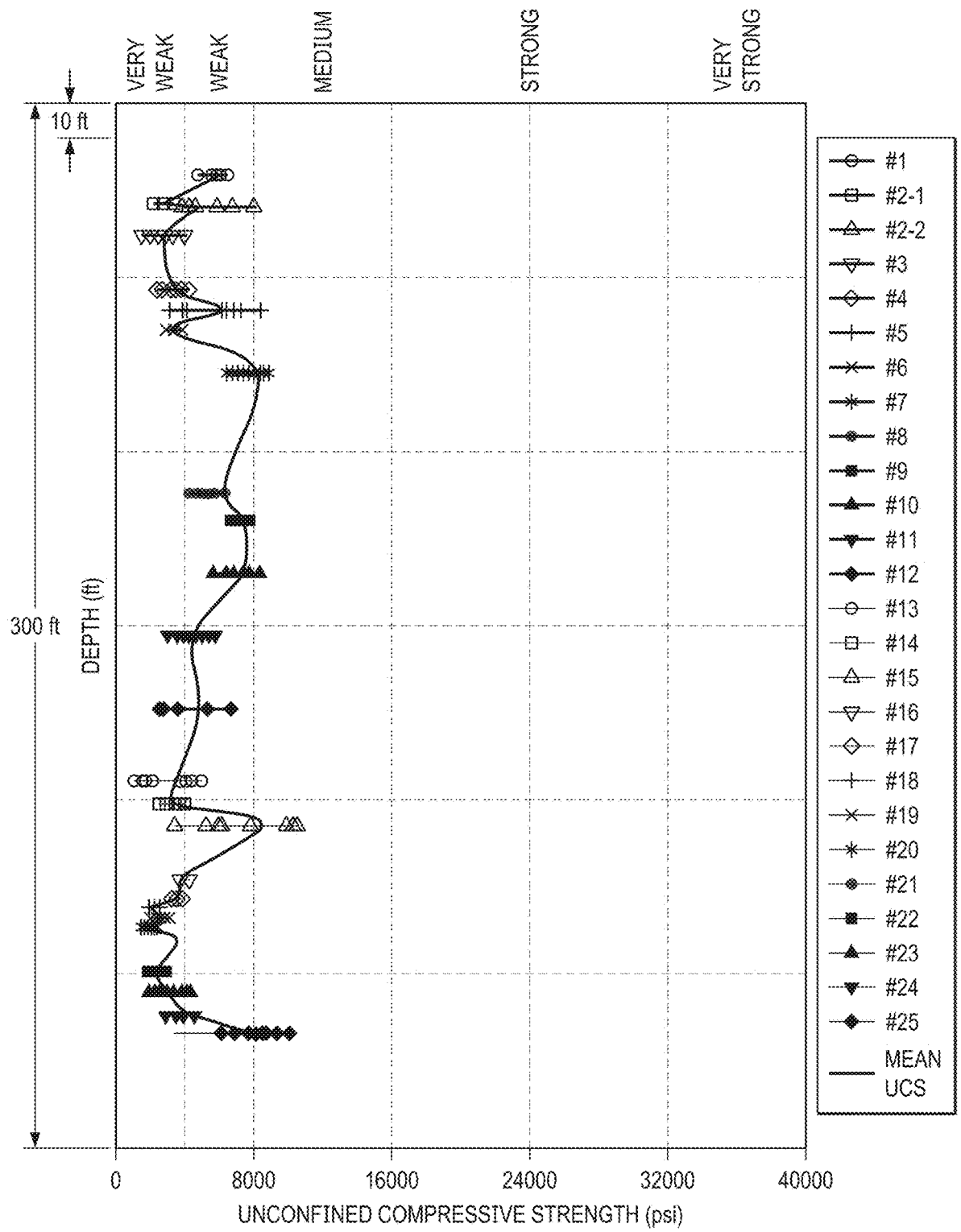
FIG. 8 is a strength contrast profile with rock strength classifications, according to some implementations of the present disclosure.

In some implementations, a plurality of rock samples collected and analyzed from a well can be used to generate a strength contrast profile for the well. The strength contrast profile can be used to identify potential frac barriers in the well. In particular, the strength contrast profile enables easy detection of features indicative of frac barriers and determination of the thickness of features. In an implementation, a rock strength classification system of rock engineering is applied to the strength contrast profile. This can contribute the engineering designs and management of frac operations quantitatively. FIG. 7 illustrates an example strength contrast profile for a well. FIG. 8 illustrates an example strength contrast profile to which a rock strength classification has been applied.

FIG. 7 is a plot 700 of UCS values versus depth. As illustrated, the UCS scale is between 0-15000 psi for the strength contrast profile. In particular, the plot 700 represents a strength contrast profile for identifying potential fracture barriers. In an example, a greater strength difference with a closer distance can be identified as a fracture barrier. Thus, this logging of the strength contrast profile can bring additional value for identifying fracture barriers. In FIG. 7, individual UCS values from each specimen from the well and the mean UCS value from each specimen are logged. The mean UCS plot represents the trend of formation strength. Specifically, in FIG. 7, the individual UCS values for 25 samples and the mean of the UCS values are plotted over depth.

FIG. 8 illustrates a plot 800 of UCS values versus depth. In particular, the plot 800 is generated by applying a rock strength classification to the plot 700, perhaps by using the rock strength classification system of rock engineering from Tables 1 and 2. As shown in FIG. 8, the plot 800 enables management of fracture operations quantitatively since the strength of the rocks can be easily extracted from the plot 800.

Figure 9:
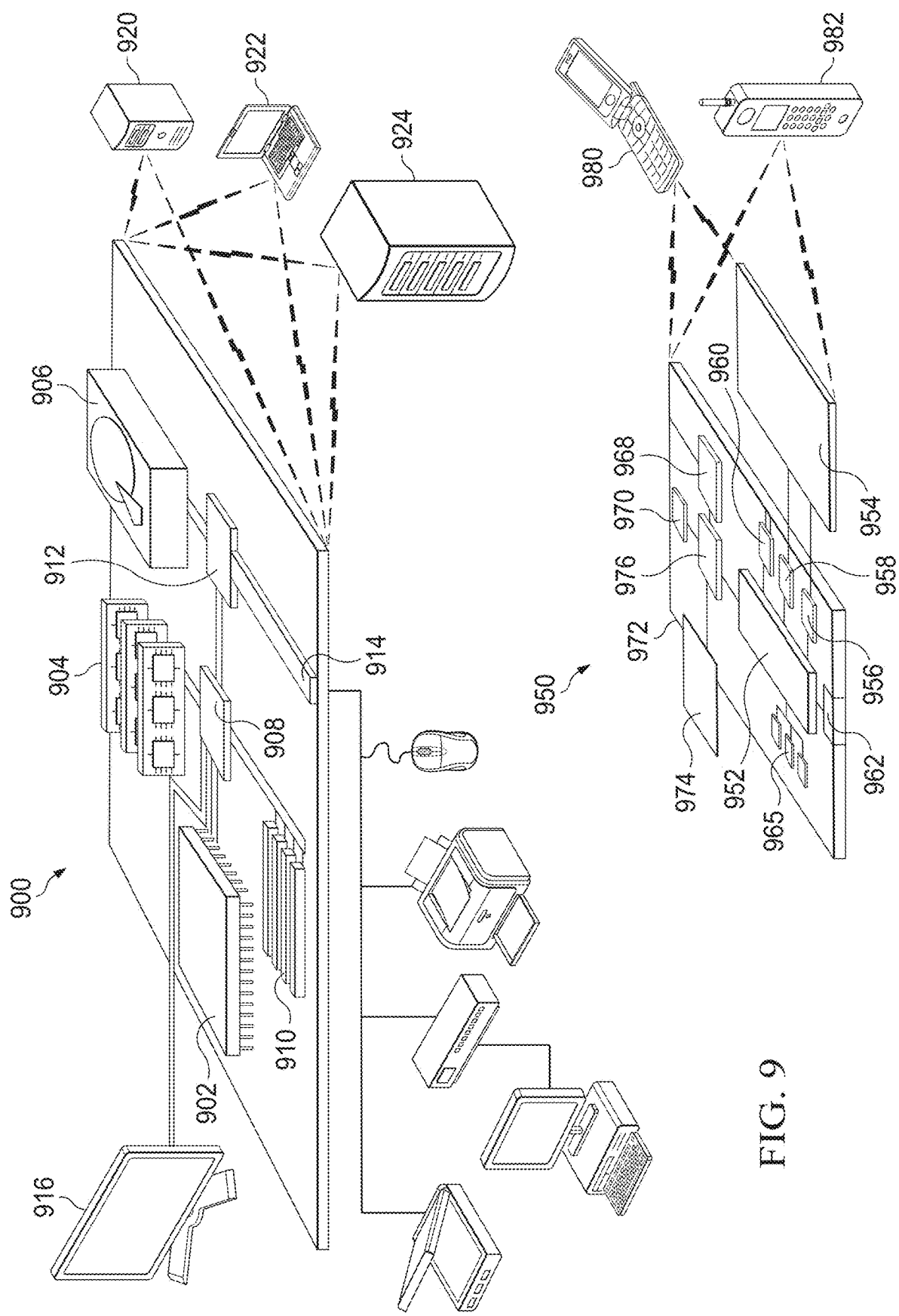
FIG. 9 illustrates an example computing environment, according to some implementations of the present disclosure.

FIG. 9 shows an example of a generic computing device 900 and a generic mobile computing device 950, which are used with the techniques described here. Computing device 900 is intended to represent various forms of digital computers, such as laptops, desktops, workstations, personal digital assistants, servers, blade servers, mainframes, and other appropriate computers. Mobile computing device 950 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and claimed in this document.

Computing device 900 includes a processor 902, memory 904, a storage device 906, a high-speed interface 908 connecting to memory 904 and high-speed expansion ports 910, and a low-speed interface 912 connecting to low-speed bus 914 and storage device 906. Each of the components 902, 904, 906, 908, 910, and 912, are interconnected using various busses, and are mounted on a common motherboard or in other manners as appropriate. The processor 902 processes instructions for execution within the computing device 900, including instructions stored in the memory 904 or on the storage device 906 to display graphical information for a GUI on an external input/output device, such as display 916 coupled to high-speed interface 908. In other implementations, multiple processors, multiple buses, or both are used, as appropriate, along with multiple memories and types of memory. Also, multiple computing devices 900 are connected, with each device providing portions of the necessary operations (for example, as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product may be tangibly embodied in an information carrier. The computer program product may also contain instructions that, when executed, perform one or more methods. The information carrier is a computer- or machine-readable medium, such as the memory 904, the storage device 906, or a memory on processor 902.

The high-speed interface 908 manages bandwidth-intensive operations for the computing device 900. The low-speed interface 912 manages lower bandwidth-intensive operations. Such allocation of functions is exemplary only. In one implementation, the high-speed interface 908 is coupled to memory 904, display 916 (for example, through a graphics processor or accelerator), and to high-speed expansion ports 910, which accepts various expansion cards (not shown). In the implementation, low-speed interface 912 is coupled to storage device 906 and low-speed bus 914. The low-speed expansion port, which may include various communication ports (for example, USB (Universal Serial Bus), Bluetooth, Ethernet, wireless Ethernet) may be coupled to one or more input/output devices, such as a keyboard, a pointing device, a scanner, or a networking device such as a switch or router, for example, through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as mobile computing device 950. Each of such devices may contain one or more of computing device 900, 950, and an entire system may be made up of multiple computing devices 900, 950 communicating with each other.

Mobile computing device 950 includes a processor 952, memory 964, an input/output device such as a display 954, a communication interface 976, and a transceiver 968, among other components. The mobile computing device 950 may also be provided with a storage device, such as a microdrive or other device, for additional storage. Each of the components 950, 952, 964, 954, 960, and 968, are interconnected using various buses, and several of the components may be mounted on a common motherboard or in other manners as appropriate.

The processor 952 may execute instructions within the mobile computing device 950, including instructions stored in the memory 964. The processor may be implemented as a chipset of chips that include separate and multiple analog and digital processors. The processor may provide, for example, for coordination of the other components of the mobile computing device 950, such as control of user interfaces, applications run by mobile computing device 950, and wireless communication by mobile computing device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952.

In addition, an external interface 962 may be provide in communication with processor 952, so as to enable near area communication of mobile computing device 950 with other devices. External interface 962 may provide, for example, for wired communication in some implementations, or for wireless communication in other implementations, and multiple interfaces may also be used.

The memory 964 stores information within the mobile computing device 950. The memory 964 may be implemented as one or more of a computer-readable medium or media, a volatile memory unit or units, or a non-volatile memory unit or units. Expansion memory 974 may also be provided and connected to mobile computing device 950 through an expansion interface 972, which may include, for example, a SIMM (Single In Line Memory Module) card interface. Such expansion memory 974 may provide extra storage space for mobile computing device 950, or may also store applications or other information for mobile computing device 950. Specifically, expansion memory 974 may include instructions to carry out or supplement the processes described herein, and may include secure information also. Thus, for example, expansion memory 974 may be provide as a security module for mobile computing device 950, and may be programmed with instructions that permit secure use of mobile computing device 950. In addition, secure applications may be provided via the SIMM cards, along with additional information, such as placing identifying information on the SIMM card in a non-hackable manner.

The memory may include, for example, flash memory, NVRAM memory, or both, as discussed below. In one implementation, a computer program product is tangibly embodied in an information carrier. The computer program product contains instructions that, when executed, perform one or more methods, such as those described herein. The information carrier is a computer- or machine-readable medium, such as the memory 964, expansion memory 974, memory on processor 952, or a propagated signal that may be received, for example, over transceiver 968 or external interface 962.

Mobile computing device 950 may communicate wirelessly through communication interface 976, which may include digital signal processing circuitry where necessary. Communication interface 976 may provide for communications under various modes or protocols, such as GSM voice calls, SMS, EMS, or MIMS messaging, CDMA, TDMA, PDC, WCDMA, CDMA2000, or GPRS, among others. Such communication may occur, for example, through transceiver 968. In addition, short-range communication may occur, such as using a Bluetooth, WiFi, or other such transceiver (not shown). In addition, GPS (Global Positioning System) receiver module 970 may provide additional navigation- and location-related wireless data to mobile computing device 950, which may be used as appropriate by applications running on mobile computing device 950.

Mobile computing device 950 may also communicate audibly using audio codec 960, which may receive spoken information from a user and convert it to usable digital information. Audio codec 960 may likewise generate audible sound for a user, such as through a speaker, for example, in a handset of mobile computing device 950. Such sound may include sound from voice telephone calls, may include recorded sound (for example, voice messages, music files, etc.) and may also include sound generated by applications operating on mobile computing device 950.

The mobile computing device 950 may be implemented in a number of different forms, as shown in the figure. For example, it may be implemented as a cellular telephone 980. It may also be implemented as part of a smartphone 982, personal digital assistant, or other similar mobile device.

Various implementations of the systems and techniques described here may be realized in digital electronic circuitry, integrated circuitry, specially designed ASICs (application specific integrated circuits), computer hardware, firmware, software, or combinations thereof. These various implementations may include implementation in one or more computer programs that are executable and interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications, or code) include machine instructions for a programmable processor, and may be implemented in a high-level procedural, object-oriented programming language, or in assembly/machine language. As used herein, the terms "machine-readable medium" and "computer-readable medium" refer to any computer program product, apparatus, or device (for example, magnetic discs, optical disks, memory, Programmable Logic Devices (PLDs)) used to provide machine instructions or data to a programmable processor, including a machine-readable medium that receives machine instructions as a machine-readable signal. The term "machine-readable signal" refers to any signal used to provide machine instructions and data to a programmable processor.

To provide for interaction with a user, the systems and techniques described here may be implemented on a computer having a display device (for example, a CRT (cathode ray tube) or LCD (liquid crystal display) monitor) for displaying information to the user, a keyboard, and a pointing device (for example, a mouse or a trackball) by which the user may provide input to the computer. Other kinds of devices may be used to provide for interaction with a user as well; for example, feedback provided to the user may be any form of sensory feedback (for example, visual feedback, auditory feedback, or tactile feedback); and input from the user may be received in any form, including acoustic, speech, or tactile input.

The systems and techniques described here may be implemented in a computing system that includes a back end component (for example, as a data server), or that includes a middleware component (for example, an application server), or that includes a front end component (for example, a client computer having a graphical user interface or a Web browser through which a user may interact with an implementation of the systems and techniques described here), or any combination of such back end, middleware, or front end components. The components of the system may be interconnected by any form or medium of digital data communication (for example, a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

While this disclosure includes some specifics, these should not be construed as limitations on the scope of the disclosure or of what may be claimed, but rather as descriptions of features of example implementations of the disclosure. Certain features described in this disclosure in the context of separate implementations can also be provided in combination in a single implementation. Conversely, various features that are described in the context of a single implementation can also be provided in multiple implementations separately or in any suitable subcombination. Moreover, although features may be described herein as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described herein should not be understood as requiring such separation in all implementations, and it should be understood that the described program components and systems can generally be integrated together in a single software product or packaged into multiple software products.

The description is presented to enable any person skilled in the art to make and use the disclosed subject matter, and is provided in the context of one or more particular implementations. Various modifications to the disclosed implementations will be readily apparent to those skilled in the art. The general principles defined in this disclosure may be applied to other implementations and applications without departing from scope of the disclosure. Thus, the present disclosure is not intended to be limited to the described or illustrated implementations, but is to be accorded the widest scope consistent with the principles and features disclosed in this disclosure.

Thus, particular implementations of the present disclosure have been described. Other implementations are within the scope of the following claims. For example, the actions recited in the claims can be performed in a different order and still achieve desirable results. A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

We claim:

1. A method for identifying fracture barriers in a well, the method comprising:
   converting rebound hardness values of a rock specimen from the well to unconfined compressive strength (UCS) values, wherein each of the rebound hardness values corresponds to a respective coordinate of a measurement grid imposed on the rock specimen, wherein the coordinates of the measurement grid are depth and columns;
   for each column of the grid, plotting the UCS values versus depth;
   mapping, based on a maximum UCS value and a minimum UCS value, a relative strength contour plot for the rock specimen;
   mapping, based on a fixed strength range, an absolute strength contour plot for the rock specimen; and
   determining, based on the relative strength contour, the absolute strength contour, and mineralogy of the rock specimen, that the rock specimen is indicative of a fracture barrier in the well.

2. The method of claim 1, wherein the measurement grid is a square grid pattern, and wherein the method further comprises:
   imposing the square grid pattern on the rock specimen;

developing a coordinate system depending on mineral particle size distributions or data resolution of a device used to measure rebound hardness values; and measuring, at intersections in the square grid pattern, rebound hardness values of the rock specimen.

3. The method of claim 1, wherein converting rebound hardness values of the rock specimen to UCS values comprises:

if the rock specimen is a ⅓ slab section core:
using a first empirical calibration equation $y=3.7727e^{0.005x}$ to convert the rebound hardness values to UCS values, and if the rock specimen is a ⅔ butt section cores:
using a second empirical calibration equation $y=2.1454e^{0.0058x}$ to convert the rebound hardness values to UCS values.

4. The method of claim 1, further comprising:
plotting, using UCS values and corresponding depths for a plurality of rock specimens from the well, a strength contrast profile for the well, wherein determining that the rock specimen is indicative of a fracture barrier in the well is further based on the strength contrast profile for the well.

5. The method of claim 4, further comprising:
applying a rock strength classification to the strength contrast profile to quantitatively classify the strength contrast profile.

6. The method of claim 1, wherein the mineralogy of the rock specimen is a micro-X-ray fluorescence (μ-XRF) elemental map generated using μ-XRF analysis of the rock specimen.

7. The method of claim 1, further comprising:
updating fracking parameters based on the fracture barrier.

8. A non-transitory computer-readable medium storing one or more instructions executable by a computer system to perform operations for identifying fracture barriers in a well, the operations comprising:

converting rebound hardness values of a rock specimen from the well to unconfined compressive strength (UCS) values, wherein each of the rebound hardness values corresponds to a respective coordinate of a measurement grid imposed on the rock specimen, wherein the coordinates of the measurement grid are depth and columns;

for each column of the grid, plotting the UCS values versus depth;

mapping, based on a maximum UCS value and a minimum UCS value, a relative strength contour plot for the rock specimen;

mapping, based on a fixed strength range, an absolute strength contour plot for the rock specimen; and determining, based on the relative strength contour, the absolute strength contour, and mineralogy of the rock specimen, that the rock specimen is indicative of a fracture barrier in the well.

9. The non-transitory computer-readable medium of claim 8, wherein the measurement grid is a square grid pattern, and wherein the operations further comprise:

imposing the square grid pattern on the rock specimen;
developing a coordinate system depending on mineral particle size distributions or data resolution of a device used to measure rebound hardness values; and measuring, at intersections in the square grid pattern, rebound hardness values of the rock specimen.

10. The non-transitory computer-readable medium of claim 8, wherein converting rebound hardness values of the rock specimen to UCS values comprises:

if the rock specimen is a ⅓ slab section core:
using a first empirical calibration equation $y=3.7727e^{0.005x}$ to convert the rebound hardness values to UCS values, and if the rock specimen is a ⅔ butt section cores:
using a second empirical calibration equation $y=2.1454e^{0.0058x}$ convert the rebound hardness values to UCS values.

11. The non-transitory computer-readable medium of claim 8, the operations further comprising:
plotting, using UCS values and corresponding depths for a plurality of rock specimens from the well, a strength contrast profile for the well, wherein determining that the rock specimen is indicative of a fracture barrier in the well is further based on the strength contrast profile for the well.

12. The non-transitory computer-readable medium of claim 11, the operations further comprising:
applying a rock strength classification to the strength contrast profile to quantitatively classify the strength contrast profile.

13. The non-transitory computer-readable medium of claim 11, the operations further comprising:
updating fracking parameters based on the fracture barrier.

14. The non-transitory computer-readable medium of claim 8, wherein the mineralogy of the rock specimen is a micro-X-ray fluorescence (μ-XRF) elemental map generated using μ-XRF analysis of the rock specimen.

15. An apparatus for identifying fracture barriers in a well, comprising:
one or more processors; and
a non-transitory computer-readable storage medium coupled to the one or more processors and storing programming instructions for execution by the one or more processors, the programming instructions instructing the one or more processors to perform operations comprising:

converting rebound hardness values of a rock specimen from the well to unconfined compressive strength (UCS) values, wherein each of the rebound hardness values corresponds to a respective coordinate of a measurement grid imposed on the rock specimen, wherein the coordinates of the measurement grid are depth and columns;

for each column of the grid, plotting the UCS values versus depth;

mapping, based on a maximum UCS value and a minimum UCS value, a relative strength contour plot for the rock specimen;

mapping, based on a fixed strength range, an absolute strength contour plot for the rock specimen; and determining, based on the relative strength contour, the absolute strength contour, and mineralogy of the rock specimen, that the rock specimen is indicative of a fracture barrier in the well.

16. The apparatus of claim 15, wherein the measurement grid is a square grid pattern, and wherein the operations further comprise:

imposing the square grid pattern on the rock specimen;
developing a coordinate system depending on mineral particle size distributions or data resolution of a device used to measure rebound hardness values; and measuring, at intersections in the square grid pattern, rebound hardness values of the rock specimen.

17. The apparatus of claim 15, wherein converting rebound hardness values of the rock specimen to UCS values comprises:
if the rock specimen is a ⅓ slab section core:
using a first empirical calibration equation $y=3.7727e^{0.005x}$ to convert the rebound hardness values to UCS values, and
if the rock specimen is a ⅔ butt section cores:
using a second empirical calibration equation $y=2.1454e^{0.058x}$ convert the rebound hardness values to UCS values.

18. The apparatus of claim 15, the operations further comprising:
plotting, using UCS values and corresponding depths for a plurality of rock specimens from the well, a strength contrast profile for the well, wherein determining that the rock specimen is indicative of a fracture barrier in the well is further based on the strength contrast profile for the well.

19. The apparatus of claim 18, the operations further comprising:
applying a rock strength classification to the strength contrast profile to quantitatively classify the strength contrast profile.

20. The apparatus of claim 15, the operations further comprising:
updating fracking parameters based on the fracture barrier.

* * * * *

UNITED STATES PATENT AND TRADEMARK OFFICE
CERTIFICATE OF CORRECTION

PATENT NO. : 11,573,159 B2
APPLICATION NO. : 16/736646
DATED : February 7, 2023
INVENTOR(S) : Ji Soo Lee et al.

It is certified that error appears in the above-identified patent and that said Letters Patent is hereby corrected as shown below:

In the Claims

In Column 16, Line 10, Claim 10, please replace "convert" with -- to convert --.

In Column 17, Line 12, Claim 17, please replace "$y=2.1454e^{0.058x}$" with -- $y=2.1454e^{0.0058x}$ to --.

Signed and Sealed this
Eleventh Day of April, 2023

Katherine Kelly Vidal
*Director of the United States Patent and Trademark Office*